(12) United States Patent
Yamakawa et al.

(10) Patent No.: US 10,224,857 B2
(45) Date of Patent: Mar. 5, 2019

(54) MOTOR CONTROLLER

(71) Applicant: TOYOTA JIDOSHA KABUSHIKI KAISHA, Toyota-shi, Aichi-ken (JP)

(72) Inventors: Toshifumi Yamakawa, Shizuoka-ken (JP); Masaki Okamura, Toyota (JP); Naoyoshi Takamatsu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 233 days.

(21) Appl. No.: 14/917,129

(22) PCT Filed: Sep. 8, 2014

(86) PCT No.: PCT/IB2014/001756
§ 371 (c)(1),
(2) Date: Mar. 7, 2016

(87) PCT Pub. No.: WO2015/036826
PCT Pub. Date: Mar. 19, 2015

(65) Prior Publication Data
US 2016/0204729 A1 Jul. 14, 2016

(30) Foreign Application Priority Data

Sep. 10, 2013 (JP) ................. 2013-187346

(51) Int. Cl.
*H02M 7/5395* (2006.01)
*H02P 27/06* (2006.01)
(Continued)

(52) U.S. Cl.
CPC .......... *H02P 27/06* (2013.01); *H02M 7/5395* (2013.01); *H02P 27/08* (2013.01); *H02M 2001/0009* (2013.01)

(58) Field of Classification Search
CPC ................. H02P 27/08; H02M 7/5395; H02M 2001/009
(Continued)

(56) References Cited

U.S. PATENT DOCUMENTS 6,914,409 B2 * 7/2005 Nukushina ................ H02P 6/28
318/599
7,236,337 B2 * 6/2007 Minatani ............... B60L 3/0023
361/18
(Continued)

FOREIGN PATENT DOCUMENTS

JP 2000-023490 A 1/2000
JP 2009-098091 A 5/2009
(Continued)

*Primary Examiner* — Eduardo Colon Santana
*Assistant Examiner* — Devon Joseph
(74) *Attorney, Agent, or Firm* — Hunton Andrews Kurth LLP

(57) ABSTRACT

Provided is a motor controller that controls a motor system including: a power converter, a smoothing capacitor, a three-phase AC motor, and a current sensor. The motor controller is provided with an electronic control unit. The electronic control unit specifies a target phase that is a phase of a second phase voltage command signal having a largest difference from a first phase voltage command signal having a signal level that is neither a maximum nor a minimum signal level, based on three phase voltage command signals generated from the detection value of the current sensor, and corrects the detection value of the current sensor, which detects the phase current of the target phase, such that a terminal voltage of the smoothing capacitor matches the desired voltage value.

14 Claims, 16 Drawing Sheets

(51) Int. Cl.
*H02P 27/08* (2006.01)
*H02M 1/00* (2006.01)

(58) Field of Classification Search
USPC .......................................................... 318/504
See application file for complete search history.

(56) References Cited

U.S. PATENT DOCUMENTS

| | | | | |
|---|---|---|---|---|
| 8,339,076 | B2* | 12/2012 | Aoki | G01D 5/24452 |
| | | | | 318/400.04 |
| 8,456,128 | B2* | 6/2013 | Fotherby | H02M 7/48 |
| | | | | 318/106 |
| 8,884,567 | B2* | 11/2014 | Senkou | H02P 21/50 |
| | | | | 318/434 |
| 9,203,330 | B2* | 12/2015 | Suzuki | H02P 6/18 |
| 2009/0189555 | A1* | 7/2009 | Chen | H02P 21/0089 |
| | | | | 318/400.07 |
| 2011/0063883 | A1* | 3/2011 | Hattori | H02M 7/53873 |
| | | | | 363/148 |
| 2011/0292700 | A1* | 12/2011 | Arakawa | H02M 7/53871 |
| | | | | 363/95 |
| 2014/0001990 | A1* | 1/2014 | Takamatsu | H02P 27/08 |
| | | | | 318/400.22 |
| 2014/0306634 | A1* | 10/2014 | Sakai | H02P 27/085 |
| | | | | 318/490 |
| 2015/0210173 | A1* | 7/2015 | Funabashi | B60L 11/1816 |
| | | | | 307/10.1 |

FOREIGN PATENT DOCUMENTS

| | | |
|---|---|---|
| JP | 2015-035897 A | 2/2015 |
| WO | 2015/019143 A2 | 2/2015 |
| WO | 2015/025437 A1 | 2/2015 |

* cited by examiner

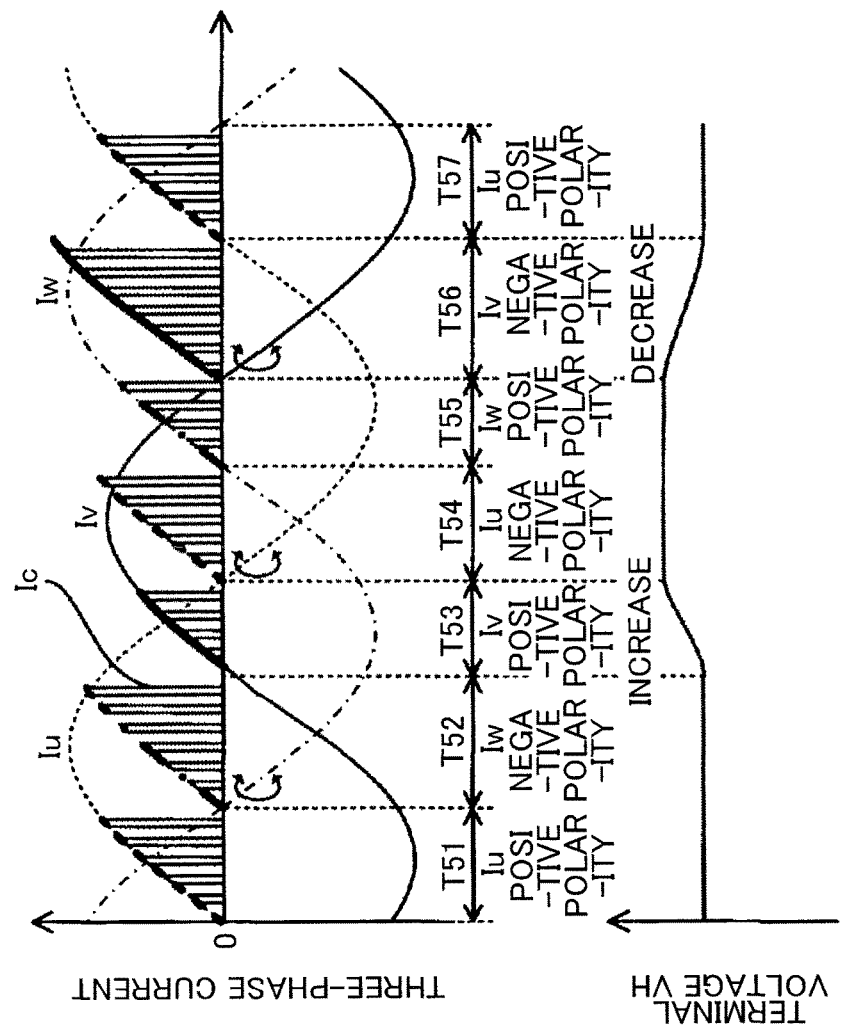

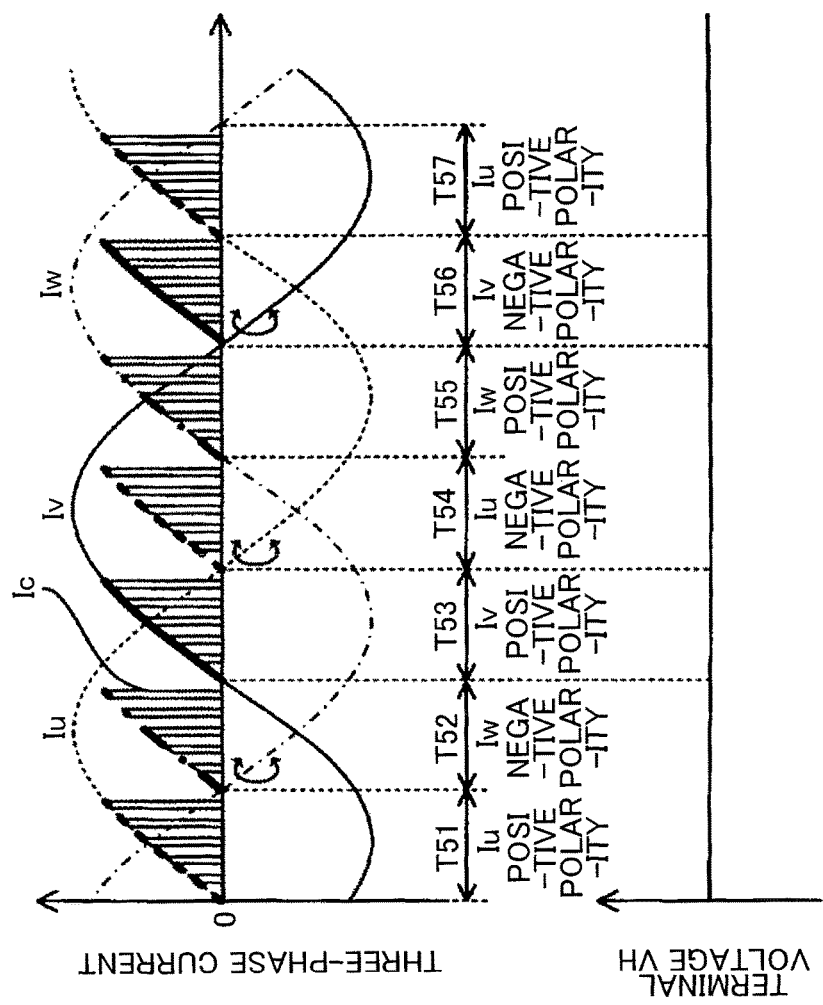

FIG. 6B

| TIME PERIOD | CENTER-PHASE VOLTAGE COMMAND SIGNAL | CAPACITOR CURRENT PHASE |
|---|---|---|
| #1/#7 | U-PHASE VOLTAGE COMMAND SIGNAL | V PHASE |
| #2/#8 | W-PHASE VOLTAGE COMMAND SIGNAL | V PHASE |
| #3/#9 | W-PHASE VOLTAGE COMMAND SIGNAL | U PHASE |
| #4/#10 | V-PHASE VOLTAGE COMMAND SIGNAL | U PHASE |
| #5/#11 | V-PHASE VOLTAGE COMMAND SIGNAL | W PHASE |
| #6/#12 | U-PHASE VOLTAGE COMMAND SIGNAL | W PHASE |

F I G . 8
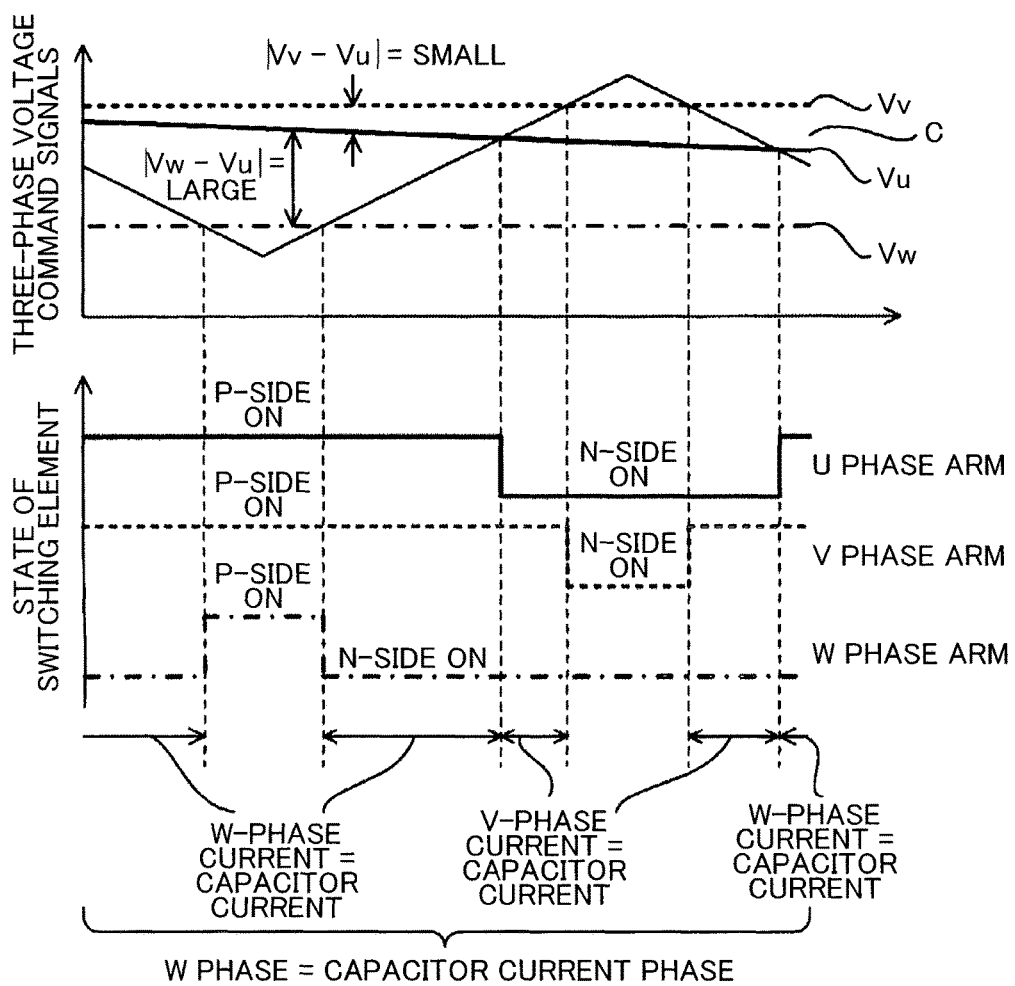

MOTOR CONTROLLER

CROSS-REFERENCE TO RELATED APPLICATIONS

This is a national phase application based on the PCT International Patent Application No. PCT/IB2014/001756 filed Sep. 8, 2014, claiming priority to Japanese Patent Application No. 2013-187346 filed Sep. 10, 2013, the entire contents of both of which are incorporated herein by reference.

BACKGROUND OF THE INVENTION

1. Field of the Invention

The invention relates to a technical field of motor controllers for controlling a motor system equipped with a three-phase alternating current (AC) motor.

2. Description of Related Art

Pulse width modulation (PWM) control is an example of a control method for driving a three-phase AC motor. The PWM control is used to control a power converter (for example, an inverter) that converts a direct current (DC) voltage (DC power) into an AC voltage (AC power) according to the magnitude relationship between a carrier signal having a predetermined frequency and a phase voltage command signal that has been set with the object of matching the phase current supplied to a three-phase AC motor with a desired value.

When a power converter is controlled, the phase current is typically detected with a current sensor. In this case, the detection value of the current sensor can include an error (for example, an offset error which occurs when a value obtained by adding a DC component to the actual current value is output as a detection value, or a gain error which occurs when a value obtained by amplification or attenuation of the actual current value is output as a detection value). Accordingly, a technique for correcting the error included in the detection value of the current sensor has been suggested for increasing the detection accuracy of the current sensor (see, for example, Japanese Patent Application Publication No. 2000-023490 (JP 2000-023490 A). For example, JP 2000-023490 A discloses the technique for correcting an error while a PWM signal, which drives the inverter, is not output from the controller (in other words, from after the motor has been started till the capacitor charge is completed, which is a period of time in which the phase current does not flow).

Japanese Patent Application Publication No. 2009-098091 (JP 2009-098091 A) is another example of related art documents relating to the invention of the present application.

However, with the technique disclosed in JP 2000-023490 A, an error can be corrected only immediately after the motor is started. The resultant technical problem is that an error cannot be corrected as the motor is driven.

SUMMARY OF THE INVENTION

With consideration for the abovementioned problems presented by way of an example, the invention provides a motor controller that can correct an error included in the detection value of the current sensor.

According to an aspect of the invention, provided is a motor controller that controls a motor system. The motor system is equipped with a direct current power supply, a power converter, a smoothing capacitor, a three-phase alternating current motor, and a current sensor. The power converter is configured to convert direct current power supplied from the direct current power supply into alternating current power. The smoothing capacitor is connected electrically in parallel with the power converter. The three-phase alternating current motor is driven by using the alternating current power output from the power converter. The current sensor detects a phase current supplied to the three-phase alternating current motor. The motor controller is provided with an electronic control unit. The electronic control unit is configured to: (a) specify a target phase that is a phase of a second phase voltage command signal having a largest difference from a first phase voltage command signal having a signal level that is neither a maximum nor a minimum signal level based on three phase voltage command signals generated from a detection value of the current sensor and regulating operation of the three-phase alternating current motor; and (b) correct the detection value of the current sensor, which detects the phase current of the target phase, such that a terminal voltage of the smoothing capacitor matches a desired voltage value.

With the motor controller of the invention, the motor system can be controlled. The motor system, which is the object of control performed by the motor controller, is equipped with the direct current power supply, smoothing capacitor, power converter, three-phase alternating current motor, and a current sensor. The direct current power supply outputs direct current power (in other words, a direct current voltage or a direct current). The smoothing capacitor is connected electrically in parallel with the power converter. Typically, the smoothing capacitor is connected electrically in parallel with the direct current power supply. Therefore, the smoothing capacitor can suppress changes in the terminal voltage of the smoothing capacitor (that is, terminal voltage of at least one of the direct current power supply and the power converter). The power converter converts direct current power supplied from the direct current power supply into alternating current power (typically, three-phase alternating current power). As a result, the three-phase alternating current motor is driven by using the alternating current power supplied from the power converter to the three-phase alternating current motor.

In order to control such motor system, the motor controller is provided with the electronic control unit performing the below-described control. The electronic control unit specifies a target phase from among the three phases of the three-phase alternating current motor based on three phase voltage command signals (typically, a U-phase voltage command signal, a V-phase voltage command signal, and a W-phase voltage command signal). The target phase is the phase of the second phase voltage command signal having a largest difference from the first phase voltage command signal having a signal level that is neither a maximum nor a minimum signal level. In other words, the target phase is the phase of the second phase voltages command signal which has a largest difference from the first phase voltage command signal which has the second largest signal level (in other words, the second smallest signal level).

For example, when the relationship of (signal level of U-phase voltage command signal)>(signal level of V-phase voltage command signal)>(signal level of W-phase voltage command signal) is fulfilled, the V-phase voltage command signal corresponds to the first phase voltage command signal. Further, where the aforementioned relationship is fulfilled and also the relationship of (signal level of U-phase voltage command signal)−(signal level of V-phase voltage command signal)|>|(signal level of W-phase voltage command signal)−(signal level of V-phase voltage command signal) is fulfilled, the U-phase voltage command signal corresponds to the second phase voltage command signal. Therefore, in this case, the U phase is the target phase.

The phase voltage command signals are alternating current signals regulating the operation of the three-phase alternating current motor. The phase voltage command signals are typically generated from the detection value of current sensor (in other words, the detection value specifying a characteristics (typically, a signal level) of the detected phase current that is output from the current sensor detecting the phase current). In this case, for example, the phase voltage command signals may be generated, as appropriate, from the standpoint of matching the torque output by the three-phase alternating current motor with a desired value.

Further, the electronic control unit corrects the detection value of the current sensor such that the terminal, voltage of the smoothing capacitor matches the desired voltage value. In this case, the electronic control unit may correct the detection value of the current sensor such that the terminal voltage of the smoothing capacitor matches the desired voltage value by directly referring to the terminal voltage (typically, the detection value of the voltage sensor detecting the terminal voltage). Alternatively, the electronic control unit may correct the detection value of the current sensor such that the terminal voltage of the smoothing capacitor matches the desired voltage value by referring to another parameter (for example, a capacitor current which is the current flowing in the smoothing capacitor) that indirectly indicates the terminal voltage. In this case, the electronic control unit can be also said to actually correct the detection value of the current sensor such that the other parameter indirectly indicating the terminal voltage matches a desired value.

In particular, in the motor controller of the invention, the detection value of a current sensor detecting the phase current of the target phase specified by the electronic control unit is corrected such that the terminal voltage matches the desired voltage value. Incidentally, where a current sensor detecting the phase current of the target phase specified by the electronic control unit is not present (in other words, the motor system is not provided with a current sensor detecting the phase current of the target phase), the electronic control does not need to correct the detection value of the current sensor.

More specifically, within the time period in which the electronic control unit specifies that the target phase is the U phase, the electronic control unit corrects the detection value of the current sensor detecting the U-phase current such that the terminal voltage within the time period in which the electronic control unit specifies that the target phase is the U phase matches the desired voltage value. However, the electronic control unit may continue correcting the detection value of the current sensor detecting the U-phase current so as to continue the correction operation, which has been performed within the time period in which the electronic control unit specifies that the target phase is the U phase, even within a time period in which the electronic control unit does not specify that the target phase is the U phase. For example, when the detection value of the current sensor detecting the U-phase current is corrected by a predetermined amount within the time period in which the electronic control unit specifies that the target phase is the U phase, the electronic control unit may continue correcting the detection value of the current sensor detecting the U-phase current by the predetermined amount even within the time period in which the electronic control unit does not specify that the target phase is the U phase.

Alternatively, for example, within the time period in which the electronic control unit specifies that the target phase is the V phase, the electronic control unit corrects the detection value of the current sensor detecting the V-phase current such that the terminal voltage within the time period in which the electronic control unit specifies that the target phase is the V phase matches the desired voltage value. However, the electronic control unit may continue correcting the detection value of the current sensor detecting the V-phase current so as to continue the correction operation, which has been performed within the time period in which the electronic control unit specifies that the target phase is the V phase, even within a time period in which the electronic control unit does not specify that the target phase is the V phase. For example, when the detection value of the current sensor detecting the V-phase current is corrected in a predetermined mode within the time period in which the electronic control unit specifies that the target phase is the V phase, the electronic control unit may continue correcting the detection value of the current sensor detecting the V-phase current in the predetermined mode even within the time period in which the electronic control unit does not specify that the target phase is the V phase.

Alternatively, for example, within the time period in which the electronic control unit specifies that the target phase is the W phase, the electronic control unit corrects the detection value of the current sensor detecting the W-phase current such that the terminal voltage within the time period in which the electronic control unit specifies that the target phase is the W phase matches the desired voltage value. However, the electronic control unit may continue correcting the detection value of the current sensor detecting the W-phase current so as to continue the correction operation, which has been performed within the time period in which the electronic control unit specifies that the target phase is the W phase, even within a time period in which the electronic control unit does not specify that the target phase is the W phase. For example, when the detection value of the current sensor detecting the W-phase current is corrected in a predetermined mode within the time period in which the electronic control unit specifies that the target phase is the W phase, the electronic control unit may continue correcting the detection value of the current sensor detecting the W-phase current in the predetermined mode even within the time period in which the electronic control unit does not specify that the target phase is the W phase.

In this case, where the detection value of the current sensor includes an error (in other words, the difference or deviation between the detection value of the current sensor and the actual value of the phase current), the motor controller erroneously recognizes that the detection value of the current sensor is the actual value of the phase current. Therefore, where it is presumed that the motor controller controls the motor system such that the detection value of the current sensor becomes the desired current value, the actual value of the phase current changes by the amount corresponding to the error. For example, the actual value of the phase current becomes a value obtained by adding the error to the desired current value or subtracting the error therefrom.

In this case, as will be explained hereinbelow in greater detail with reference to the drawings, within a time period in which the predetermined phase is the target phase, a change of the phase current of the predetermined phase (for example, a change with respect to the desired current value) can cause a change in the terminal voltage of the smoothing capacitor. Meanwhile, within a time period in which the predetermined phase is not the target phase, a change of the phase current of the predetermined phase does not cause or hardly causes a change in the terminal voltage of the smoothing capacitor. Therefore, where the terminal voltage changes in a state in which the target phase has been specified, it is highly probable that the phase current of the target phase changes. Therefore, taking into account that an error included in the detection value of the current sensor can cause a change of a phase current, where the phase current of the target phase changes, it is highly probable that an error is included in the detection value of the current sensor detecting the phase current of the target phase.

Taking into consideration such a relationship between the change of the phase current of the target phase and the change of the terminal voltage of the smoothing capacitor, since the electronic control unit in the motor controller of the invention specifies the target phase, even when the motor system is provided with a plurality of current sensors, the current sensors in which an error is included in the detection value can be specified individually. For example, even when the motor system is provided with at least two current sensors detecting individually the phase currents of at least two phases, a current sensor with a detection value including an error can be specified individually among the at least two current sensors. Furthermore, when the target phase is specified, the electronic control unit corrects the detection value of the current sensor detecting the phase current of the target phase such that the terminal voltage matches the desired voltage value (for example, such that the change amount of the terminal voltage becomes zero). As a result, where an error is included in the detection value of a current sensor, the electronic control unit can correct the detection value of the current sensor such as to eliminate the effect of the error.

Furthermore, in the motor controller of the invention, the electronic control unit can specify the target phase based on phase voltage command signals generated not only immediately after the motor system has been started, but also after a predetermined time period has elapsed since the start of the motor system (for example, while the motor system operates in the usual mode). In addition, the electronic control unit can correct the detection value of the current sensor based on the terminal voltage of the smoothing capacitor that can be detected not only immediately after the motor system has been started, but also after a predetermined time period has elapsed since the start of the motor system. Therefore, where the detection value of a current sensor includes an error, the electronic control unit can correct the detection value of the current sensor so as to eliminate the effect of the error not only immediately after the motor system has been started, but also after a predetermined time period has elapsed since the start of the motor system.

Thus, the motor controller of the invention can correct the detection value of the current sensor (in other words, correct an error included in the detection value of the current sensor).

In the motor controller, the electronic control unit may be configured to determine a mode of correcting the detection value of the current sensor, which detects the phase current of the target phase, based on: (i) a polarity of the phase current of the target phase; and (ii) a tendency of change of the terminal voltage.

With the motor controller of the above-described configuration, the electronic control unit can advantageously determine the correction mode of the detection value of the current sensor, such that the terminal voltage matches the desired voltage value, based on the polarity of the phase current of the target phase and the tendency of change of the terminal voltage. Therefore, the electronic control unit can advantageously correct the detection value of the current sensor. In other words, the error included in the detection value of the current sensor can be advantageously corrected.

Further, in the motor controller in which the correction mode of the detection value of the current sensor is determined based on the polarity of the phase current of the target phase and the tendency of change of the terminal voltage, as described hereinabove, the electronic control unit may be configured to correct the detection value of the current sensor, which detects the phase current of the target phase, in a first correction mode when (i) the polarity of the phase current of the target phase is a first polarity and (ii) the terminal voltage changes in a first change mode. The electronic control unit may be configured to correct the detection value of the current sensor, which detects the phase current of the target phase, in a second correction mode, which is different from the first correction mode, when (i) the polarity of the phase current of the target phase is a second polarity, which is different from the first polarity, and (ii) the terminal voltage changes in the first change mode.

With the motor controller of the above-described configuration, where the change mode of the terminal voltage does not change, the electronic control unit determines the correction mode of the detection value of the current sensor such that the correction mode of the detection value of the current sensor changes according to the difference in the polarity of the phase current of the target phase. As a result, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Further, in the motor controller in which the correction mode of the detection value of the current sensor is determined such that the correction mode of the detection value of the current sensor changes according to the difference in the polarity of the phase current of the target phase, as described hereinabove, the first polarity may be either of a positive polarity and a negative polarity. The second polarity is different from the first polarity among the positive polarity and the negative polarity. The first change mode may be either of a change mode in which the terminal voltage decreases and a change mode in which the terminal voltage increases. The first correction mode may be either of a correction mode in which the detection value is increased and a correction mode in which the detection value is decreased. The second correction mode is a correction mode, which is different from the first correction mode, among the correction mode in which the detection value is increased and the correction mode in which the detection value is decreased.

With the motor controller of the above-described configuration, where the change mode of the terminal voltage does not change, the electronic control unit can determine whether to increase or decrease the detection value of the current sensor according to whether the polarity of the phase current of the target phase is the positive polarity or the negative polarity. As a result, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Examples of the operation of increasing the detection value of the current sensor include an operation of adding a positive correction value to the detection value of the current sensor and an operation of multiplying the detection value of the current sensor by a coefficient larger than 1. Likewise, examples of the operation of decreasing the detection value of the current sensor include an operation of adding a negative correction value to the detection value of the current sensor (in other words, an operation of subtracting a positive correction value) and an operation of multiplying the detection value of the current sensor by a coefficient less than 1.

Further, in the motor controller in which the correction mode of the detection value of the current sensor is determined based on the polarity of the phase current of the target phase and the tendency of change of the terminal voltage, as described hereinabove, the electronic control unit may be configured to correct the detection value of the current sensor, which detects the phase current of the target phase, in a first correction mode when (i) the polarity of the phase current of the target phase is a first polarity and (ii) the terminal voltage changes in a, first change mode. The electronic control unit may be configured to correct the detection value of the current sensor, which detects the phase current of the target phase, in a second correction mode, which is different from the first correction mode, when (i) the polarity of the phase current of the target phase is the first polarity and (ii) the terminal voltage changes in a second change mode which is different from the first change mode.

With the motor controller of the above-described configuration, where the polarity of the phase current of the target phase does not change, the electronic control unit determines the correction mode of the detection value of the current sensor such that the correction mode of the detection value of the current sensor changes according to the change mode of the terminal voltage. As a result, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Further, in the motor controller in which the correction mode of the detection value of the current sensor is determined such . . . that the correction mode of the detection value of the current sensor changes according to the difference in the change mode of the terminal voltage, as described hereinabove, the first polarity may be either of a positive polarity and a negative polarity. The first change mode may be either of a change mode in which the terminal voltage decreases and a change mode in which the terminal voltage increases. The second change mode may be a change mode, which is different from the first change mode, among the change mode in which the terminal voltage decreases and the change mode in which the terminal voltage increases. The first correction mode may be either of a correction mode in which the detection value is increased and a correction mode in which the detection value is decreased. The second correction mode may be a correction mode, which is different from the first correction mode, among the correction mode in which the detection value is increased and the correction mode in which the detection value is decreased.

With the motor controller of the above-described configuration, where the polarity of the phase current of the target phase does not change, the electronic control unit can determine whether to increase or decrease the detection value of the current sensor according to whether the terminal voltage increases or decreases. As a result, the electronic control unit can advantageously determine the correction mode of the detection value of the current sensor, such that the terminal voltage matches the desired voltage value. Therefore, the electronic control unit can advantageously correct the detection value of the current sensor. In other words; the error included in the detection value of the current sensor can be advantageously corrected.

Further, in the motor controller in which the correction mode of the detection value of the current sensor is determined based on the polarity of the phase current of the target phase and the tendency of change of the terminal voltage, as described hereinabove, the electronic control unit may be configured: to correct and decrease the detection value of the current sensor, which detects the phase current of the target phase, when (i) the polarity of the phase current of the target phase is a negative polarity and (ii) the terminal voltage decreases.

With such a mode, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Further, in the motor controller in which the correction mode of the detection value of the current sensor is determined based on the polarity of the phase current of the target phase and the tendency of change of the terminal voltage, as described hereinabove, the electronic control unit may be configured to correct and increase the detection value of the current sensor, which detects the phase current of the target phase, when (i) the polarity of the phase current of the target phase is a positive polarity and (ii) the terminal voltage decreases.

With the motor controller of such a configuration, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Further, in the motor controller in which the correction mode of the detection value of the current sensor is determined based on the polarity of the phase current of the target phase and the tendency of change of the terminal voltage, as described hereinabove, the electronic control unit may be configured to correct and increase the detection value of the current sensor, which detects the phase current of the target phase, when (i) the polarity of the phase current of the target phase is a negative polarity and (ii) the terminal voltage increases.

With the motor controller of such a configuration, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Further, in the motor controller in which the correction mode of the detection value of the current sensor is determined based on the polarity of the phase current of the target phase and the tendency of change of the terminal voltage, as described hereinabove, the electronic control unit may be configured to correct and decrease the detection value of the current sensor, which detects the phase current of the target phase, when (i) the polarity of the phase current of the target phase is a positive polarity and (ii) the terminal voltage increases.

With the motor controller of such a configuration, the electronic control unit can advantageously determine the correction mode of the detection value of the current sensor, such that the terminal voltage matches the desired voltage value. Therefore, the electronic control unit can advantageously correct the detection value of the current sensor. In other words, the error included in the detection value of the current sensor can be advantageously corrected.

Further, in the motor controller according to the invention, the motor system may further include a voltage sensor and an extraction device. The voltage sensor detects the terminal voltage. The extraction device may be configured to extract a voltage component having a frequency same as that of the phase voltage command signals from a detection value of the voltage sensor. The electronic control unit may be configured to correct the detection value of the current sensor, which detects the phase current of the target phase, such that a voltage value of the voltage component extracted by the extraction device matches the desired voltage value.

With the motor controller of such a configuration, the electronic control unit can advantageously correct the error component (for example, the offset error resulting from the addition of a direct current component to the current value of the actual phase current) having a frequency same as that of the phase voltage command signals, among the errors included in the detection value of the current sensor. In other words, the electronic control unit can advantageously correct the detection value of the current sensor, such as to remove the effect of the error component (for example, the offset error) having a frequency same as that of the phase voltage command signals, among the errors included in the detection value of the current sensor.

Further, in the motor controller according to the invention, the motor system may further include a voltage sensor and an extraction device. The voltage sensor detects the terminal voltage. The extraction device may be configured to extract a voltage component having a frequency which is twice the frequency of the phase voltage command signals from the detection value of the voltage sensor. The electronic control unit is configured to correct the detection value of the current sensor, which detects the phase current of the target phase, such that a voltage value of the voltage component extracted by the extraction device matches the desired voltage, value.

With the motor controller of such a configuration, the electronic control unit can advantageously correct the error component (for example, the gain error resulting from the amplification or attenuation of the current value of the actual phase current) having a frequency which is twice the frequency of the phase voltage command signals, among the errors included in the detection value of the current sensor. In other words, the electronic control unit can advantageously correct the detection value of the current sensor, such as to remove the effect of the error component (for example, the gain error) having a frequency which is twice the frequency of the phase voltage command signals, among the errors included in the detection value of the current sensor.

Further, in the motor controller according to the invention, the motor system may further include a voltage sensor and a voltage converter. The voltage sensor detects the terminal voltage. The voltage converter may be configured to convert a voltage value of direct current power, which is supplied from the direct current power supply, such that the voltage value matches the desired voltage value. The power converter may be also configured to convert the direct current power into alternating current power, the voltage value supplied from the voltage converter having been converted to the direct current power. The electronic control unit may be configured to correct the detection value of the current sensor, which detects the phase current of the target phase, such that a voltage component matches the desired voltage value, the voltage component being obtained by removing, from the detection value of the voltage sensor, an effect of a change of the terminal voltage caused by the operation of converting the voltage value that is performed by the voltage converter.

Where the motor system is provided with the voltage converter, since the voltage converter converts the voltage value of direct current power into the desired voltage value, the terminal voltage of the smoothing capacitor matches the desired voltage value regardless of whether or not the detection value of the current sensor, which detects the phase current of the target phase, is corrected by the electronic control unit. In other words, since the terminal voltage of the smoothing capacitor is matched with the desired voltage value by the operation of the voltage converter, even when an error is included in the detection value of the current sensor, which detects the phase current of the target phase, this error does not cause changes in the terminal voltage of the smoothing capacitor. For this reason, the electronic control unit that only corrects the detection value of the current sensor, which detects the phase current of the target phase, such that the terminal voltage of the smoothing capacitor matches the desired voltage value, cannot correct the detection value of the current sensor, which detects the phase current of the target phase, when an error is included in the detection value of the current sensor, which detects the phase current of the target phase.

Meanwhile, the terminal voltage of the smoothing capacitor includes a voltage component (in other words, a change of the terminal voltage) caused by the error included in the detection value of the current sensor, which detects the phase current of the target phase, in addition to the voltage component (in other words, a change of the terminal voltage) caused by the operation of converting the voltage value performed by the voltage converter. Therefore, the voltage component obtained by removing the effect of the change of the terminal voltage caused by the operation of converting the voltage value performed by the voltage converter from the terminal voltage detected by the voltage sensor can be assumed to have a correlation with the change of the terminal voltage caused by the error included in the detection value of the current sensor, which detects the phase current of the target phase.

Accordingly, in this mode, the electronic control unit handles the voltage component, which is obtained by removing the effect of the change of the terminal voltage caused by the operation of converting the voltage value performed by the voltage converter from the detection value of the voltage sensor detecting the terminal voltage, as the substantial terminal voltage. In other words, the electronic control unit corrects the detection value of the current sensor, which detects the phase current of the target phase, such that the voltage component, which is obtained by removing the effect of the change of the terminal voltage caused by the operation of converting the voltage value performed by the voltage converter from the detection value of the voltage sensor detecting the terminal voltage, matches the desired voltage component. As a result, the electronic control unit can advantageously correct the detection value of the current sensor. In other words, the error of the current sensor can be advantageously corrected.

Further, in the motor controller according to the invention, the motor system may further include a voltage sensor and a voltage converter. The voltage sensor detects the terminal voltage. The voltage converter may be configured to convert a voltage value of direct current power, which is supplied from the direct current, power supply, such that a voltage component matches the desired voltage value, voltage component being obtained by removing, from the detection value of the voltage sensor, a voltage component having a frequency same as that of the phase voltage command signals and a voltage component having a frequency twice the frequency of the phase voltage command signals. The power converter may be configured to convert the direct current power into alternating current power, the voltage value supplied from the voltage converter having been converted to the direct current power.

Where the motor system is provided with the voltage converter, since the voltage converter converts the voltage value of direct current power into the desired voltage value, the terminal voltage of the smoothing capacitor matches the desired voltage value regardless of whether or not the detection value of the current sensor, which detects the phase current of the target phase, is corrected by the electronic control unit. In other words, since the terminal voltage of the smoothing capacitor is matched with the desired voltage value by the operation of the voltage converter, even when an error is included in the detection value of the current sensor, which detects the phase current of the target phase, this error does not cause changes in the terminal voltage of the smoothing capacitor. For this reason, the electronic control unit that only corrects the detection value of the current sensor, which detects the phase current of the target phase, such that the terminal voltage of the smoothing capacitor matches the desired voltage value, cannot correct the detection value of the current sensor, which detects the phase current of the target phase, when an error is included in the detection value of the current sensor, which detects the phase current of the target phase.

In this configuration, the terminal voltage of the smoothing capacitor also includes a voltage component (in other words, a change of the terminal voltage) caused by the error included in the detection value of the current sensor, which detects the phase current of the target phase, in addition to the voltage component (in other words, a change of the terminal voltage) caused by the operation of converting the voltage value performed by the voltage converter. Therefore, the voltage converter converts the voltage value such that the terminal voltage also including the voltage component caused by the error included in the detection value of the current sensor, which detects the phase current of the target phase, becomes the desired voltage value. Therefore, the terminal voltage of the smoothing capacitor matches the desired voltage value regardless of, whether or not the detection value of the current sensor, which detects the phase current of the target phase, is corrected by the electronic control unit. Focusing the attention on such voltage component of the terminal voltage of the smoothing capacitor, where the power converter converts the voltage value such that the voltage component, which is obtained by removing the voltage component caused by an error included in the detection value of the current sensor, which detects the phase current of the target phase, from the terminal voltage, becomes the desired voltage value, it can be said that when an error is included in the detection value of the current sensor, which detects the phase current of the target phase, the terminal voltage does not match the desired voltage value.

Accordingly, in this mode, the power converter converts the voltage value of direct current power supplied from the direct current power supply, such that the voltage component obtained by removing the voltage component (in this case, the voltage component having a frequency same as the frequency, of the phase voltage command signals and the voltage component having a frequency that is twice the frequency of the phase voltage command signals) caused by the error included in the detection value of the current sensor, which detects the phase current of the target phase, from the detection value (that is, the terminal voltage) of the voltage sensor becomes the desired voltage value. Therefore, the electronic control unit can correct the detection value of the current sensor, which detects the phase current of the target phase, such that the terminal voltage changing due to the error included in the detection value of the current sensor, which detects the phase current of the target phase, matches the desired voltage value. As a result, the electronic control unit can advantageously correct the detection value of the current sensor. In other words, the error included in the detection value of the current sensor can be advantageously corrected.

The power converter may also convert the voltage value of direct current power supplied from the direct current power supply, such that the voltage value of the voltage component obtained by removing the voltage component caused by the error included in the detection value of the current sensor, from the detection value of the voltage sensor matches the desired voltage value.

In the motor controller according to the invention, the electronic control unit may be configured to correct the detection value of the current sensor, which detects the phase current of the target phase, such that a capacitor current flowing in the smoothing capacitor matches a desired current value.

With the motor controller of the above-described configuration, the electronic control unit may correct the detection value of the current sensor, which detects the phase current of the target phase, such that the capacitor current matches the desired current value, in addition to, or instead of correcting the detection value of the current sensor, which detects the phase current of the target phase, such that the terminal voltage matches the desired voltage value, with consideration for the correlation between the terminal voltage of the smoothing capacitor and the current flowing in the smoothing capacitor (that is, the capacitor current). In other words, the electronic control unit may correct the detection value of the current sensor, which detects the phase current of the target phase, such that the capacitor current matches the desired current value, by directly referring to the capacitor current in addition to, or instead of directly referring to the terminal voltage. Even in this case, the electronic control unit can correct the detection value of the current sensor such that the terminal voltage matches the desired voltage value. As a result, the electronic control unit can advantageously correct the detection value of the current sensor. In other words, the error included in the detection value of the current sensor can be advantageously corrected.

The operation and other merits of the motor controller according to the invention will be made apparent from the embodiments explained hereinbelow.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A and 5B are graphs showing the relationship between three-phase currents (in other words, the U-phase current, V-phase current, and W-phase current), capacitor current, and terminal voltage in the case in which an error is included in, the V-phase current detection signal, and also the relationship between three-phase currents (in other words, the U-phase current, V-phase current, and W-phase current), capacitor current, and terminal voltage in the case in which no error is included in the V-phase current detection signal;

FIGS. 6A and 6B are a graph and a table showing the relationship between the capacitor current phase and the magnitude relationship between three-phase voltage command signals (in other words, the U-phase voltage command signal, V-phase voltage command signal, and W-phase voltage command signal);

FIG. 8 is a graph showing the relationship between three-phase voltage command signals and the state of switching elements provided in the inverter;

DETAILED DESCRIPTION OF EMBODIMENTS

Embodiments of the vehicle controller are described below.

Initially, the first embodiment is described with reference to FIGS. 1 to 9A, 9B, and 9C.

Figure 1:
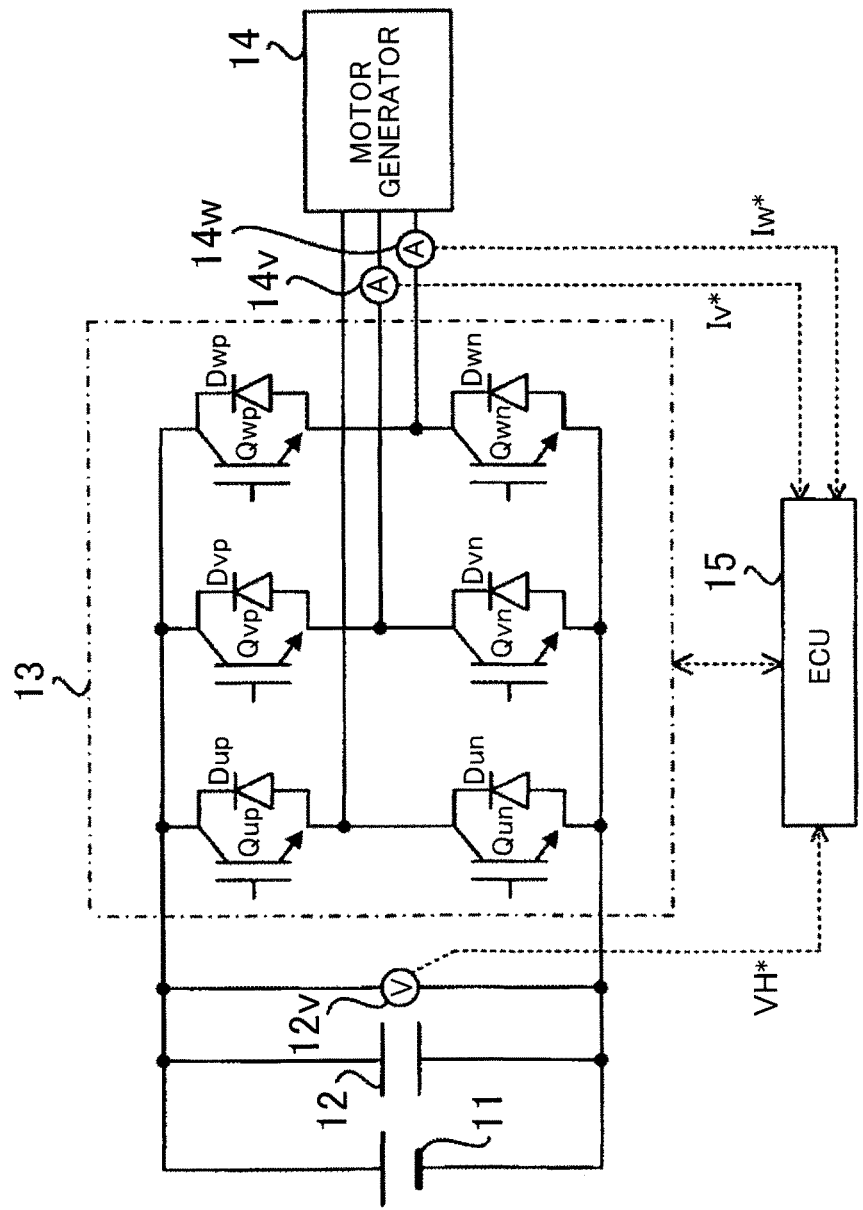
FIG. 1 is a block diagram showing the configuration of the vehicle of the first embodiment of the invention.

The configuration of vehicle 1 of the first embodiment is described with reference to FIG. 1. FIG. 1 is a block diagram of the configuration of the vehicle 1 of the first embodiment.

As shown in FIG. 1, the vehicle 1 is provided with a direct current (DC) power supply 11, a smoothing capacitor 12, a voltage sensor 12v, an inverter 13, which is a specific example of the "power converter", a motor generator 14, which is a specific example of the "three-phase alternating current (AC) motor", a V-phase current sensor 14v, a W-phase current sensor 14w, and an electronic control unit (ECU) 15, which is a specific example of the "motor controller".

The DC power supply 11 is a chargeable electric storage device. The DC power supply 11 is, for example, a secondary battery (for example, a, nickel metal hydride battery or a lithium ion battery) or a capacitor (for example, an electric double layer capacitor or a high-capacity capacitor).

The smoothing capacitor 12 is a voltage smoothing capacitor connected between a positive electrode line of the DC power supply 11 and a negative electrode line of the DC power supply 11. In other words, the smoothing capacitor 12 serves for smoothing the fluctuations of a terminal voltage VH between the positive electrode line and the negative electrode line.

The voltage sensor 12v detects the terminal voltage VH of the smoothing capacitor 12. The detection signal of the voltage sensor 12v (called hereinbelow, as appropriate, "terminal voltage detection signal VH*") is referred to by the ECU 15.

The inverter 13 converts the DC power (DC voltage) supplied from the DC power supply 11 into AC power (three-phase AC voltage). In order to convert the DC power (DC voltage) into AC power (three-phase AC voltage), the inverter 13 is provided with a U-phase arm including a p-side switching element Qup and an n-side switching element Qun, a V-phase arm including a p-side switching element Qvp and an n-side switching element Qvn, and a W-phase arm including a p-side switching element Qwp and an n-side switching element Qwn. The arms of the inverter 13 are connected in parallel between the positive electrode line and the negative electrode line. The p-side switching element Qup and the n-side switching element Qun are connected in series between the positive electrode line and the negative electrode line. The p-side switching element Qvp and the n-side switching element Qvn are similarly connected. The p-side switching element Qwp and the n-side switching element Qwn are also similarly connected. A rectifying diode Dup through which an electric current flows from an emitter terminal of the p-side switching element Qup to a collector terminal of the p-side switching element Qup is connected to the p-side switching element Qup. Rectifying diodes Dun to Dwn are likewise connected to the n-side switching element Qun to the n-side switching element Qwn, respectively. An intermediate point of the upper arm (in other words, each p-side switching element) and the lower arm (in other words, each n-side switching element) of each phase arm in the inverter 13 is connected to the respective phase coil of the motor generator 14. As a result, the AC power (three-phase AC power) generated as a result of the conversion operation performed by the inverter 13 is supplied to the motor generator 14.

The motor generator 14 is a three-phase AC motor generator. The motor generator 14 operates to generate a torque necessary for the vehicle 1 to run. The torque generated by the motor generator 14 is transmitted to drive wheels through a drive shaft mechanically coupled to a rotating shaft of the motor generator 14. The motor generator 14 may also perform power regeneration (generation) when the vehicle 1 is braked.

The V-phase current sensor 14v detects a phase current (that is, a V-phase current Iv) flowing in a V-phase winding of the motor generator 14. The detection signal of the V-phase current sensor 14v (called hereinbelow, as appropriate, a "V-phase current detection signal Iv*") is referred to, as appropriate, by the ECU 15.

The W-phase current sensor 14w detects a phase current (that is, a W-phase current Iw) flowing in a W-phase winding of the motor generator 14. The detection signal of the W-phase current sensor 14w (called hereinbelow, as appropriate, a "W-phase current detection signal Iw*") is referred to, as appropriate, by the ECU 15.

The ECU 15 is an electronic control unit for controlling the operation of the vehicle 1. In particular, in the first embodiment, the ECU 15 performs an inverter control operation for controlling the operation of the inverter 13. The inverter control operation performed by the ECU 15 is explained below in greater detail (see, for example, FIG. 3).

Figure 2:
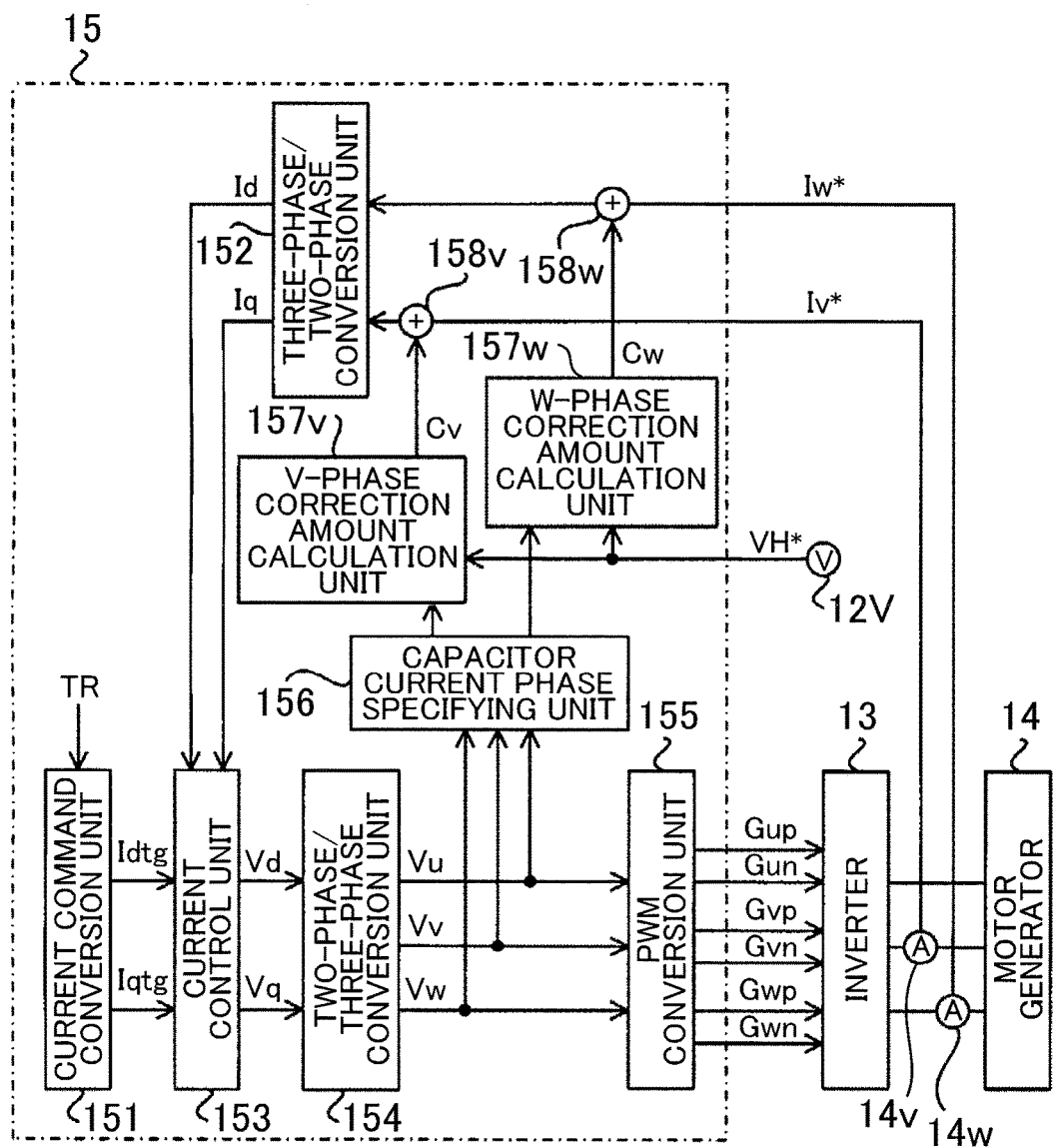
FIG. 2 is a block diagram showing the configuration of the ECU (in particular, the configuration for controlling the operation of the inverter) in the first embodiment.

The configuration of the ECU 15 (in particular, the configuration for controlling the operation of the inverter 13) is explained below with reference to FIG. 2. FIG. 2 is a block diagram showing the configuration of the ECU 15 (in particular, the configuration for controlling the operation of the inverter 13) of the first embodiment.

As shown in FIG. 2, the ECU 15 is provided with a current command conversion unit 151, a three-phase/two-phase conversion unit 152, a current control unit 153, a two-phase/three-phase conversion unit 154, a PWM conversion unit 155, a capacitor current phase specifying unit 156, which is a specific example of the "specifying device", a correction amount calculation unit 157, which is a specific example of the "correction device" (more specifically, a V-phase correction amount calculation unit 157v and a W-phase correction amount calculation unit 157w), and an adder 158, which is a specific example of the "correction device" (more specifically, a V-phase adder 158v and a W-phase adder 158w).

The current command conversion unit 151 generates a two phase current command signal (that is, a d-axis current command signal Idtg and a q-axis current command signal Iqtg) based on a torque command value TR of the three-phase AC motor 14. The current command conversion unit 151 outputs the d-axis current command signal Idtg and the q-axis current command signal Iqtg to the current control unit 153.

The three-phase/two-phase conversion unit 152 acquires the V-phase current Iv (more specifically, the V-phase current detection signal Iv* which is a detection signal of the current sensor 14v) as feedback information from the V-phase current sensor 14v. The three-phase/two-phase conversion unit 152 also acquires the W-phase current Iw (more specifically, the W-phase current detection signal Iw* which is a detection signal of the current sensor 14w) as feedback information from the W-phase current sensor 14w. The three-phase/two-phase conversion unit 152 converts the V-phase current detection signal Iv* and the W-phase current detection signal Iw* corresponding to the three-phase current values into the d-axis current Id and the q-axis current Iq corresponding to two-phase current values. The three-phase/two-phase conversion unit 152 outputs the d-axis current Id and the q-axis current Iq to the current control unit 153.

The current control unit 153 generates a d-axis voltage command signal Vd and a q-axis voltage command signal Vq, which correspond to two-phase voltage command signals, based on a difference between the d-axis current command signal Idtg and the q-axis current command signal Iqtg, which are output from the current command conversion unit 151, and the d-axis current Id and the q-axis current Iq output from the three-phase/two-phase conversion unit 152. In this case, the current control unit 153 may generate the d-axis voltage command signal Vd and the q-axis voltage command signal Vq by using proportional integral (PI) control or proportional integral derivative (PID) control. The current control unit 153 outputs the d-axis voltage command signal Vd and the q-axis voltage command signal Vq to the two-phase/three-phase conversion unit 154.

The two-phase/three-phase conversion unit 154 converts the d-axis voltage command signal Vd and the q-axis voltage command signal Vq into a U-phase voltage command signal Vu, a V-phase voltage command signal Vv, and a W-phase voltage command signal Vw which are the three-phase voltage command signals. The two-phase/three-phase conversion unit 154 outputs the U-phase voltage command signal Vu, V-phase voltage command signal Vv, and W-phase voltage command signal Vw to the PWM conversion unit 155.

The PWM conversion unit 155 generates a U-phase PWM signal Gup for driving the p-side switching element Qup and a U-phase PWM signal Gun for driving the n-side switching element Qun based on the magnitude relationship between the U-phase voltage command signal Vu and a carrier signal C having a predetermined carrier frequency f. For example, the PWM conversion unit 155 may generate the U-phase PWM signals Gup and Gun for switching ON the p-side switching element Qup where the U-phase voltage command signal Vu which is in a state lower than the carrier signal C is to be matched with the carrier signal C. Meanwhile, for example, where the U-phase voltage command signal Vu which is in a state higher than the carrier signal C is to be matched with the carrier signal C, the PWM conversion unit 155 may generate the U-phase PWM signals Gup and Gun for switching ON the n-side switching element Qun. The PWM conversion unit 155 outputs the U-phase PWM signals Gup and Gun to the inverter 13. As a result, the inverter 13 (in particular, the p-side switching element Qup and the n-side switching element Qun constituting the U-phase arm of the inverter 13) operates in response to the U-phase PWM signals Gup and Gun.

Further, the PWM conversion unit 155 generates a V-phase PWM signal Gyp for driving the p-side switching element Qvp and a V-phase PWM signal Gvn for driving the n-side switching element Qvn based on the magnitude relationship between the V-phase voltage command signal Vv and the carrier signal C. In addition, the PWM conversion unit 155 generates a W-phase PWM signal Gwp for driving the p-side switching element Qwp and a W-phase PWM signal Gwn for driving the n-side switching element Qwn based on the magnitude relationship between the W-phase voltage command signal Vw and the carrier signal C. The generation mode of the V-phase PWM signals Gyp and Gvn and the W-phase PWM signals Gwp and Gwn is the same as that of the U-phase PWM signals Gup and Gun.

The capacitor current phase specifying unit 156 specifies the capacitor current phase. In other words, the capacitor current phase specifying unit 156 specifies whether or not the capacitor current phase is the U phase, whether or not the capacitor current phase is the V phase, and whether or not the capacitor current phase is the W phase. In other words, the capacitor current phase specifying unit 156 specifies which phase among the U phase, V phase, and W phase is the capacitor current phase. The capacitor current phase, as referred to herein, is the phase of the main phase current that regulates the capacitor current Ic (that is, the current flowing in the smoothing capacitor 12). For example, as will be described in detail hereinbelow, taking into account that the waveform of the capacitor current Ic is a repetition of intermittent pulses (see, for example, FIGS. 5A and 5B), the capacitor current phase is the phase of the phase current having a signal level of substantially the same form as a virtual line connecting the peak values of the pulse waveforms of the capacitor current Ic (in other words, the phase current forming a virtual line connecting the peak values of the capacitor current Ic).

The operation of the capacitor current phase specifying unit 156 will be described hereinbelow in greater detail (see FIGS. 6A, 6B, and 8). Therefore detailed explanation of the operation of the capacitor current phase specifying unit 156 is herein omitted.

The V-phase correction amount calculation unit 157v calculates a correction amount (V-phase correction amount) Cv for correcting the V-phase current detection signal Iv* which is the detection signal of the V-phase current sensor 14v. More specifically, the V-phase correction amount calculation unit 157v calculates the V-phase correction amount Cv necessary for correcting (typically, eliminating) an error αv included in the V-phase current detection signal Iv*.

In particular, it is preferred that the V-phase correction amount calculation unit 157v calculate the V-phase correction amount Cv based on the terminal voltage detection signal VH* that is to be inputted to the V-phase correction amount calculation unit 157v within a time period in which the capacitor current phase is specified as the V phase. More specifically, when the error αv is included in the V-phase current detection signal Iv*, the error αv can cause an increase/decrease in the terminal voltage VH (in other words, the terminal voltage detection signal VH*). Therefore, in the present embodiment, the V-phase correction amount calculation unit 157v may calculate the V-phase correction amount Cv such that the increase/decrease amount (change amount) of the terminal voltage detection signal VH* becomes substantially zero. In other words, the V-phase correction amount calculation unit 157v may calculate the V-phase correction amount Cv such that the terminal voltage detection signal VH* matches the desired voltage value.

The W-phase correction amount calculation unit 157w calculates a correction amount (W-phase correction amount) Cw for correcting the W-phase current detection signal Iw* which is the detection signal of the W-phase current sensor 14w. More specifically, the W-phase correction amount calculation unit 157w calculates the W-phase correction amount Cw necessary for correcting an error αw included in the W-phase current detection signal Iw*.

In particular, it is preferred that the W-phase correction amount calculation unit 157w calculate the W-phase correction amount Cw based on the terminal voltage detection signal VH* that is to be inputted to the W-phase correction amount calculation unit 157w within a time period in which the capacitor current phase is specified as the W phase. More specifically, when the error αw is included in the W-phase current detection signal Iw*, the error αw can cause an increase/decrease in the terminal voltage VH (in other words, the terminal voltage detection signal VH*). Therefore, in the present embodiment, the W-phase correction amount calculation unit 157w may calculate the W-phase correction amount Cw such that the increase/decrease amount (change amount) of the terminal voltage detection signal VH* becomes substantially zero. In other words, the W-phase correction amount calculation unit 157w may calculate the W-phase correction amount Cw such that the terminal voltage detection signal VH* matches the desired voltage value.

The operation of the V-phase correction amount calculation unit 157v and the W-phase correction amount calculation unit 157w will be described hereinbelow in greater detail. Therefore detailed explanation of the operation of the V-phase correction amount calculation unit 157v and the W-phase correction amount calculation unit 157w is herein omitted.

The V-phase adder 158v adds the V-phase correction amount Cv calculated by the V-phase correction amount calculation unit 157v to the V-phase current detection signal Iv*. As a result, the error αv included in the V-phase current detection signal Iv* is corrected (typically, eliminated). As a result, the increase/decrease amount (change amount) of the terminal voltage VH of the smoothing capacitor 12 becomes substantially zero.

The W-phase adder 158w adds the W-phase correction amount Cw calculated by the W-phase correction amount calculation unit 157w to the W-phase current detection signal Iw*. As a result, the error αw included in the W-phase current detection signal Iw* is corrected (typically, eliminated). As a result, the increase/decrease amount (change amount) of the terminal voltage VH of the smoothing capacitor 12 becomes substantially zero.

Figure 3:
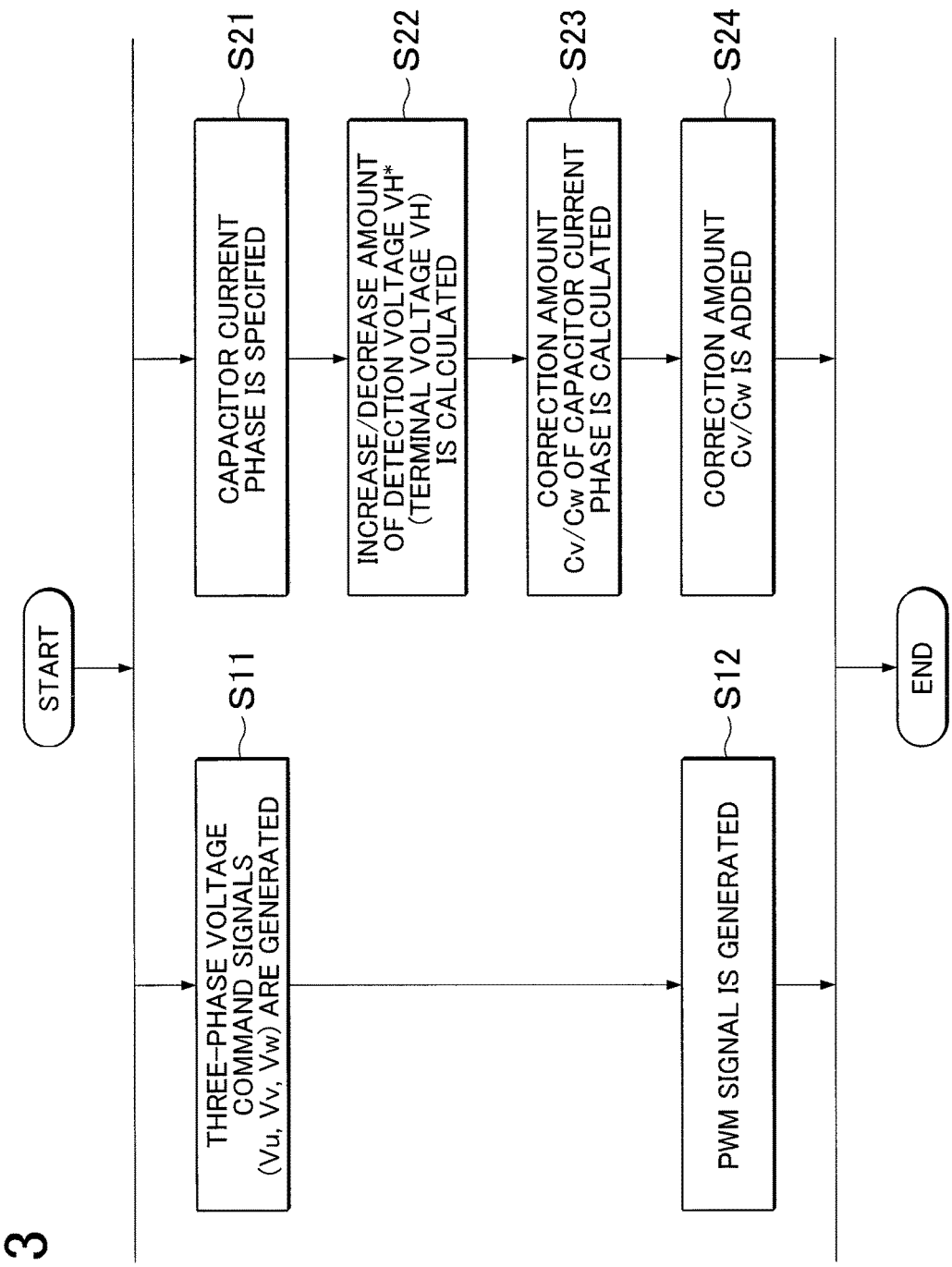
FIG. 3 is a flowchart showing the flow of inverter control operation in the first embodiment.

The flow of inverter control operation performed in the vehicle 1 of the first embodiment (in other words, the inverter control operation performed by the ECU 15) will be explained below with reference to FIG. 3. FIG. 3 is a flowchart showing the flow of the inverter control operation in the first embodiment.

As shown in FIG. 3, the two-phase/three-phase conversion unit 154 generates three-phase voltage command signals (that is, the U-phase voltage command signal Vu, V-phase voltage command signal Vv, and W-phase voltage command signal Vw) (step S11). The method for generating the three-phase voltage command signals is described above with reference to FIG. 2.

Then, the PWM conversion unit 155 generates the U-phase PWM signals Gup and Gun based on the magnitude relationship between the U-phase voltage signal Vu and the carrier signal C (step S12). Likewise, the PWM conversion unit 155 generates the V-phase PWM signals Gyp and Gvn based on the magnitude relationship between the V-phase voltage signal Vv and the carrier signal C (step S12). Likewise, the PWM conversion unit 155 generates the W-phase PWM signals Gwp and Gwn based on the magnitude relationship between the W-phase voltage signal Vw and the carrier signal C (step S12). As a result, the inverter 13 is driven based on the PWM signals.

Before or after the operations of step S11 and step S12, or in parallel therewith, the ECU 15 corrects the error αv included in the V-phase current detection signal Iv* which is the detection signal of the V-phase current sensor 14v (step S21 to step S24). The ECU 15 also corrects the error αw included in the W-phase current detection signal Iw* which is the detection signal of the W-phase current sensor 14w (step S21 to step S24).

Figure 4A:
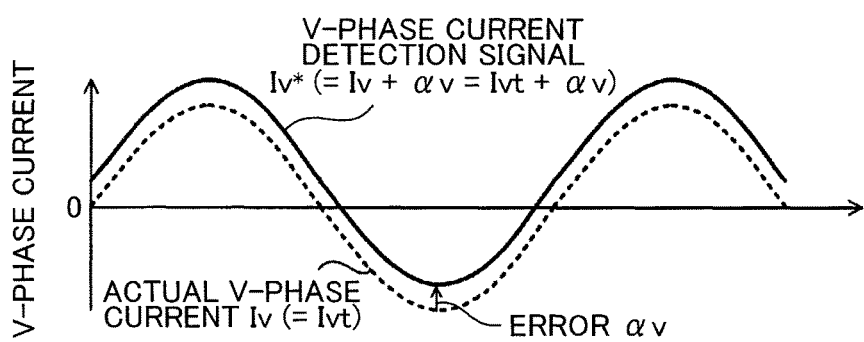
FIGS. 4A and 4B are graphs illustrating the relationship between the V-phase current detection signal and the actual V-phase current in the case in which an error is generated in the V-phase current detection signal.
Figure 4B:
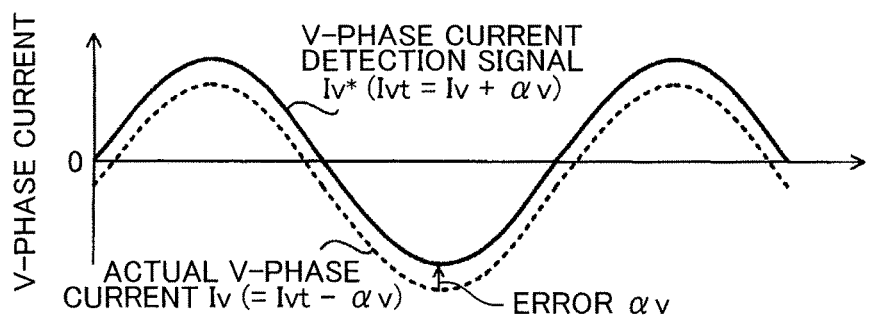

The case in which the error αv is included in the V-phase current detection signal Iv* is explained below with reference to FIGS. 4A, 4B, 5A, and 5B. FIGS. 4A and 4B show graphs representing the relationship between the V-phase current detection signal Iv* in the case in which the error αv is included in the V-phase current detection signal Iv* and the actual V-phase current Iv. FIGS. 5A and 5B are graphs representing the relationship between three phase currents (that is, the U-phase current Iu, V-phase current Iv, and W-phase current Iw), the capacitor current Ic, and the terminal voltage VH in the case in which the error αv is included in the V-phase current detection signal Iv*, and also the relationship between three phase currents (that is, the U-phase current Iu, V-phase current Iv, and W-phase current Iw), the capacitor current Ic, and the terminal voltage VH, in the case in which the error αv is not included in the V-phase current detection signal Iv*.

As shown in FIG. 4A, it is assumed that the error αv is included in the V-phase current detection signal Iv*. In other words, it is assumed that the V-phase current detection signal Iv* is a value obtained by adding the error αv to the actual V-phase current Iv (in other words, the V-phase current detection signal Iv*=the actual V-phase current Iv+error αv). It is also assumed that initially the actual V-phase current Iv matches the target current value Ivt. In the example shown in FIG. 4A, the error αv is an offset error.

In this case, as shown in FIG. 4B, the ECU 15 controls the operation of the inverter 13 such that the V-phase current detection signal Iv* matches the target current value Ivt (see the operation from step S11 to step S12 in FIG. 3). As a result, the actual V-phase current Iv becomes a current which is less than the target current value Ivt by the error αv (in other words, (V-phase currently)=(target current value Ivt)–(error αv)). In other words, the actual V-phase current Iv is less than the current that should be obtained (that is, the target current value Ivt).

In this case, each phase current successively regulates the capacitor current Ic flowing in the smoothing capacitor 12. Typically the phase current with a zero signal level regulates the capacitor current Ic till a predetermined time period elapses after the signal level of the phase current has become zero. For example, FIG. 5A shows an example in which the capacitor current Ic in a time period T51 is regulated by the U-phase current Iu of a positive polarity, the capacitor current Ic in a time period T52 is regulated by the W-phase current Iw of a negative polarity, the capacitor current Ic in a time period T53 is regulated by the V-phase current of a positive polarity, the capacitor current Ic in a time period T54 is regulated by the U-phase current of a negative polarity, the capacitor current Ic in a time period T55 is regulated by the W-phase current of a positive polarity, and the capacitor current Ic in a time period T56 is regulated by the V-phase current of a negative polarity. When the capacitor current Ic is regulated by the phase current of a negative polarity, it can be said that the phase current obtained by reversing the polarity of the phase current of a negative polarity regulates the capacitor current Ic. Therefore, in the example shown in FIG. 5A, the capacitor current phase is the U phase within the time period T51 and the time period T54. Likewise, in the example shown in FIG. 5A, the capacitor current phase is the W phase within the time period T52 and the time period T55. Likewise, in the example shown in FIG. 5A, the capacitor current phase is the V phase within the time period T53 and the time period T56. After a time period T57, the state within the time period T51 to the time period T56 is repeated.

Where the V-phase current detection signal Iv* includes the error αv, as shown in FIG. 5A, the actual V-phase current Iv has a value that is less by the error αv than the target current value Ivt. Meanwhile, the actual U-phase current Iu and the actual W-phase current Iw are assumed to match the target current value Ivt. In this case, the signal waveform of the V-phase current Iv is shifted in the negative direction with respect to the signal waveforms of the U-phase current Iu and the W-phase current Iw. Therefore, the capacitor current Ic within the time period in which the capacitor current phase is the V phase increases or decreases by comparison with the capacitor current Ic within the time period in which the capacitor current phase is the U phase or V phase. More specifically, the capacitor current Ic within the time period T53 in which the capacitor current phase is the V phase decreases with respect to the capacitor current Ic within the time period in which the capacitor current phase is the U phase or V phase. Meanwhile, the capacitor current Ic within the time period T56 in which the capacitor current phase is the V phase increases with respect to the capacitor current Ic within the time period in which the capacitor current phase is the U phase or V phase.

The decrease of the capacitor current Ic means the decrease in power consumption in the motor generator 14. As a result, as shown in FIG. 5A, the decrease of the capacitor current Ic leads to the increase in the terminal voltage VH of the smoothing capacitor 12. Likewise, the increase in the capacitor current Ic means the increase in power consumption in the motor generator 14. As a result, as shown in FIG. 5A, the increase of the capacitor current Ic leads to the decrease in the terminal voltage VH of the smoothing capacitor 12. For this reason, when an error (offset error) αv is included in the V-phase current detection signal Iv*, the terminal voltage VH changes at a frequency equal to the frequency of the V-phase current detection signal Iv*. Typically, when an error αv is included in the V-phase current detection signal Iv*, the terminal voltage VH changes within the time period in which the capacitor current phase is the V phase.

When an error (gain error) αv is included in the V-phase current detection signal Iv*, the terminal voltage VH changes with a frequency twice the frequency of the V-phase current detection signal Iv* (this case is not shown in the figures to simplify the explanation).

In FIGS. 4A, 4B, 5A, and 5B, an explanation is made by using an example in which an error αv is included in the V-phase current detection signal Iv*. However, the same result is obtained when an error αw is included in the W-phase current detection signal Iw*. In other words, when an error (offset error) αw is included in the W-phase current detection signal Iw*, the terminal voltage VH changes at a frequency equal to the frequency of the W-phase current detection signal Iw*. Typically, when the error αw is included in the W-phase current detection signal Iw*, the terminal voltage VH changes within the time period in which the capacitor current phase is the W phase.

Meanwhile, where the error αv is not included in the V-phase current detection signal Iv*, as shown in FIG. 5B, the signal waveform of the V-phase current Iv is not shifted in the negative direction with respect to the signal waveforms of the U-phase current Iu and the W-phase current Iw. Therefore, the capacitor current Ic within the time period in which the capacitor current phase is the V phase is substantially the same as the capacitor current Ic within the time period in which the capacitor current phase is the U phase or V phase. Therefore, when the error (offset error) αv is not included in the V-phase current detection signal Iv*, the terminal voltage VH hardly changes.

Such changes in the terminal voltage VH can lead to a failure of the switching elements provided in the inverter 13. Therefore, apparently steps should be taken to improve the withstanding voltage characteristic of the switching elements in order to prevent the switching elements from a failure. Alternatively, steps should be taken to increase the electrostatic capacitance of the smoothing capacitor in order to suppress the changes in the terminal voltage VH. However, those measures increase the cost and are, therefore, not necessarily the best measures. For this reason, in the present embodiment, steps are taken to correct the error αv included in the V-phase current detection signal Iv*, which is the original cause of the changes in the terminal voltage VH.

Investigating the steps for correcting the error αv, where the error αv is included in the V-phase current detection signal Iv*, the terminal voltage VH changes within the time period in which the capacitor current phase is the V phase. Likewise, where the error αw is included in the W-phase current detection signal Iw*, the terminal voltage VH changes within the time period in which the capacitor current phase is the W phase. Therefore, by detecting the change of the terminal voltage VH, the ECU 15 can recognize that there is a relatively high possibility of at least either of the V-phase current detection signal Iv* and the W-phase current detection signal Iw* including an error. Furthermore, by specifying the capacitor current phase within the time period in which the terminal voltage VH changes, the ECU 15 can specify which of the V-phase current detection signal Iv* and the W-phase current detection signal Iw* includes the error. In other words, by specifying the capacitor current phase and monitoring the change of the terminal voltage VH, the ECU 15 can individually specify and also correct both the error αv included in the V-phase current detection signal Iv* and the error αw included in the W-phase current detection signal Iw*.

More specifically, where the terminal voltage detection signal VH* changes while the V phase is specified as the capacitor current phase, the ECU 15 can recognize that an error αv is included in the V-phase current detection signal Iv*. Therefore, in which case, the ECU 15 calculates the V-phase correction amount Cv for correcting the V-phase current detection current Iv* such that the variation amount of the terminal voltage detection signal VH* within the time period in which the V phase is specified as the capacitor current phase becomes zero while the V phase is specified as the capacitor current phase. As a result, the ECU 15 can correct (eliminate) the error αv included in the V-phase current detection signal Iv*.

Likewise, where the terminal voltage detection signal. VH* changes while the W phase is specified as the capacitor current phase, the ECU 15 can recognize that an error αw is included in the W-phase current detection signal Iw*. Therefore, in which case, the ECU 15 calculates the W-phase correction amount Cw for correcting the W-phase current detection current Iw* such that the variation amount of the terminal voltage detection signal VH* within the time period in which the W phase is specified as the capacitor current phase becomes zero while the W phase is specified as the capacitor current phase. As a result, the ECU 15 can correct (eliminate) the error αw included in the W-phase current detection signal Iw*.

The explanation of the operation for correcting the error αv included in the V-phase current detection signal Iv* and the error αw included in the W-phase current detection signal Iw* is continued hereinbelow with reference to FIG. 3 again.

As shown in FIG. 3, in order to correct the error αv included in the V-phase current detection signal Iv* and the error αw included in the W-phase current detection signal Iw*, the capacitor current phase specifying unit 156 initially specifies the capacitor current phase (step S21).

In the first embodiment, the capacitor current phase specifying unit 156 uses the magnitude relationship between the three-phase voltage command signals (that is, the U-phase voltage command signal Vu, V-phase voltage command signal Vv, and W-phase voltage command signal Vw) to specify the capacitor current phase.

More specifically, in the first embodiment, the capacitor current phase specifying unit 156 initially specifies a center-phase voltage command signal, having a signal level which is neither the largest nor the smallest among the U-phase voltage command signal Vu, V-phase voltage command signal Vv, and W-phase voltage command signal Vw. In other words, the capacitor current phase specifying unit 156 initially specifies a center-phase voltage command signal with the second largest (or the second smallest) signal level among the U-phase voltage command signal Vu, V-phase voltage command signal Vv, and W-phase voltage command signal Vw. Specifically, the capacitor current phase specifying unit 156 initially specifies a center-phase voltage command signal having a signal level closest to a zero level (or an average value of signal levels of the U-phase voltage command signal Vu, V-phase voltage command signal. Vv, and W-phase voltage command signal Vw) among the U-phase voltage command signal Vu, V-phase voltage command signal. Vv, and W-phase voltage command signal Vw.

Then, the capacitor current phase specifying unit 156 specifies as the capacitor current phase the phase of a phase voltage command signal, which is not the center-phase voltage command signal and has the larger absolute value of the difference in signal level with the center-phase voltage command signal, among the U-phase voltage command signal Vu, V-phase voltage command signal Vv, and W-phase voltage command signal Vw. In other words, the capacitor current phase specifying unit 156 specifies as the capacitor current phase the phase of a phase voltage command signal which is the farthest from the center-phase voltage command signal, among the U-phase voltage command signal Vu, V-phase voltage command signal Vv, and W-phase voltage command signal Vw.

The operation of specifying the capacitor current phase based on the magnitude relationship between the three-phase voltage command signals (that is, the U-phase voltage command signal Vu, V-phase voltage command signal Vv, and W-phase voltage command signal Vw) is explained below with reference to FIGS. 6A and 6B. FIGS. 6A and 6B are a graph and a table illustrating the relationship between the capacitor current phase and the magnitude relationship between the three-phase voltage command signals (that is, the U-phase voltage command signal Vu, V-phase voltage command signal Vv, and W-phase voltage command signal Vw).

Figure 6A:
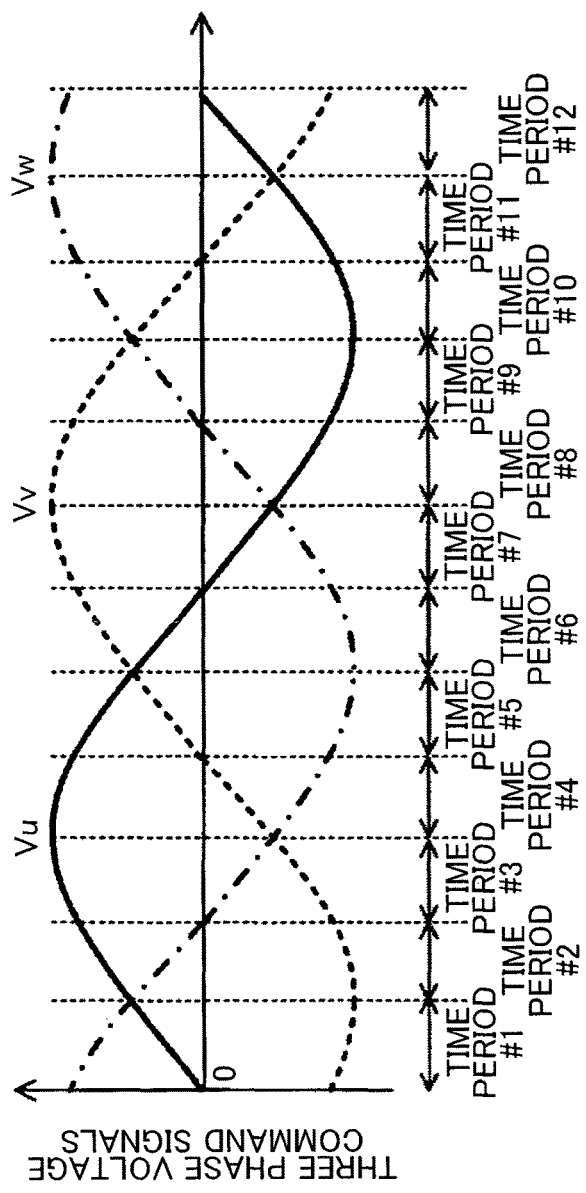

In the three-phase voltage command signals shown in FIG. 6A, the attention is focused on time period #4. In the time period #4, the following relationship is valid: (signal level of W-phase voltage command signal Vw)<(signal level of V-phase voltage command signal Vv)<(signal level of U-phase voltage command signal Vu). Therefore, in this case, as shown in FIG. 6B, the V-phase voltage command signal Vv becomes the center-phase voltage command signal. Further, within the time period #4, the following relationship is also valid: |(signal level of U-phase voltage command signal Vu)−(signal level of V-phase voltage command signal Vv)|>|(signal level of W-phase voltage command signal Vw)−(signal level of V-phase voltage command signal Vv)|. Therefore, in this case, as shown in FIG. 6B, it is specified that the U phase is the capacitor current phase.

Furthermore, as shown in FIGS. 6A and 6B, within the time period #1 and time period #7 in which the relationship of (signal level of V-phase voltage command signal Vv)< (signal level of U-phase voltage command signal Vu)< (signal level of W-phase voltage command signal Vw) and the relationship of |(signal level of V-phase voltage command signal Vv)−(signal level of U-phase voltage command signal Vu)|>|(signal level of W-phase voltage command signal Vw)−(signal level of U-phase voltage command signal Vu)| are fulfilled, the U-phase voltage command signal Vu becomes the center-phase voltage command signal and the V phase is the capacitor current phase. Likewise, within the time period #2 and time period #8 in which the relationship of (signal level of V-phase voltage command signal Vv)<(signal level of W-phase voltage command signal Vw)<(signal level of U-phase voltage command signal Vu) and the relationship of |(signal level of V-phase voltage command signal Vv)−(signal level of W-phase voltage command signal Vw)|>|(signal level of U-phase voltage command signal Vu)−(signal level of W-phase voltage command signal Vw)| are fulfilled, the W-phase voltage command signal Vw becomes the center-phase voltage command signal and the V phase is the capacitor current phase. Likewise, within the time period #3 and time period #9 in which the relationship of (signal level of V-phase voltage command signal Vv)<(signal level of W-phase voltage command signal Vw)|<|(signal level of U-phase voltage command signal Vu) and the relationship of |(signal level of U-phase voltage command signal Vu)−(signal level of W-phase voltage command signal Vw)|>|(signal level of V-phase voltage command signal Vv)−(signal level of W-phase voltage command signal Vw)| are fulfilled, the W-phase voltage command signal Vw becomes the center-phase voltage command signal and the U phase is the capacitor current phase. Likewise, within the time period #4 and time period #10 in which the relationship of (signal level of W-phase voltage command signal Vw)<(signal level of V-phase voltage command signal Vv)<(signal level of U-phase voltage command signal Vu) and the relationship of |(signal level of U-phase voltage command signal Vu)−(signal level of V-phase voltage command signal Vv)|>|(signal level of W-phase voltage command signal Vw)−(signal level of V-phase voltage command signal Vv)| are fulfilled, the V-phase voltage command signal Vv becomes the center-phase voltage command signal and the U phase is the capacitor current phase. Likewise, within the time period #5 and time period #11 in which the relationship of (signal level of W-phase voltage command signal Vw)<(signal level of V-phase voltage command signal Vv)<(signal level of U-phase voltage command signal Vu) and the relationship of |(signal level of W-phase voltage command signal Vw)−(signal level of V-phase voltage command signal Vv)|>|(signal level of U-phase voltage command signal Vu)−(signal level of V-phase voltage command signal Vv)| are fulfilled, the V-phase voltage command signal Vv becomes the center-phase voltage command signal and the W phase is the capacitor current phase. Likewise, within the time period #6 and time period #12 in which the relationship of (signal level of W-phase voltage command signal Vw)< (signal level of U-phase voltage command signal Vu)< (signal level of V-phase voltage command signal Vv), and the relationship of |(signal level of W-phase voltage command signal Vw)−(signal level of U-phase voltage command signal Vu)|>|(signal level of V-phase voltage command signal Vv)−(signal level of U-phase voltage command signal Vu)| are fulfilled, the U-phase voltage command signal Vu becomes the center-phase voltage command signal and the W phase is the capacitor current phase.

Figure 7A:
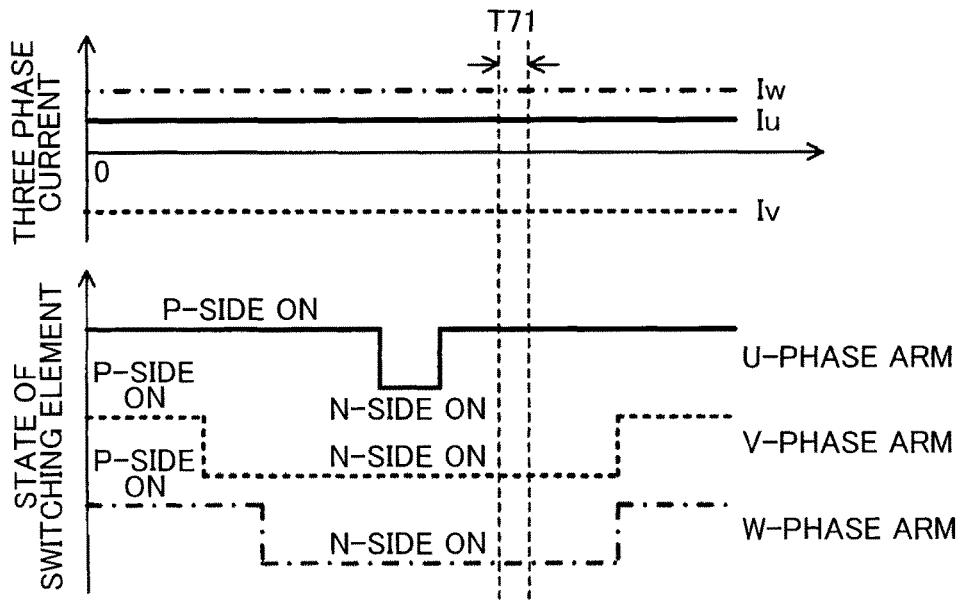
FIGS. 7A and 7B are explanatory diagrams showing the state of switching elements provided in the inverter.
Figure 7B:
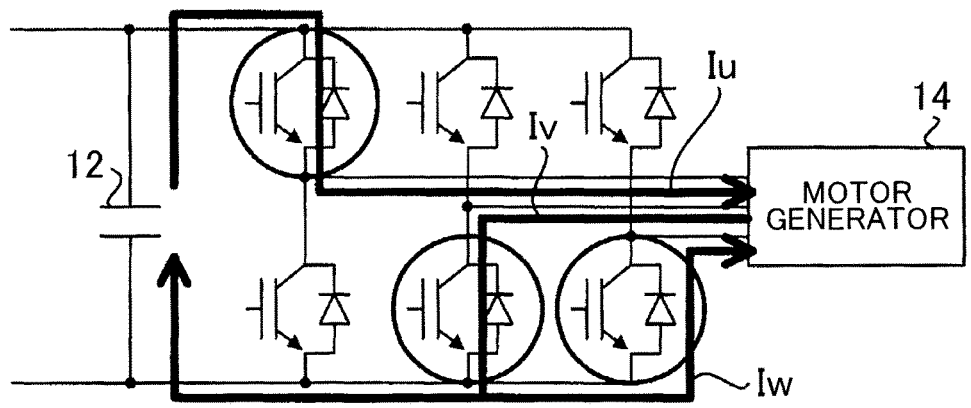

In this case, the reason why it is possible to specify the capacitor current value based on the magnitude relationship between the three-phase voltage command signals (that is, the U-phase voltage command signal Vu, V-phase voltage command signal Vv, and W-phase voltage command signal Vw) will be explained below with reference to FIGS. 7A, 7B, and 8. FIGS. 7A and 7B are explanatory drawings showing the state of each switching element in the inverter 13. FIG. 8 is a graph showing the relationship between the three-phase voltage command signals and the state of the switching elements in the inverter 13.

The reason is explained using an example in which the U-phase current Iu, V-phase current Iv, and W-phase current Iw shown in FIG. 7A flow, and the state of the switching elements in the inverter 13 changes in a mode shown in FIG. 7A. Where the attention is focused on the time period T71, the U-phase current Iu and W-phase current Iw have a positive polarity (the direction of the electric current from the inverter 13 toward the motor generator 14 is taken as a positive polarity), whereas the V-phase current Iv has a negative polarity. Further, within the time period T71, the P-side switching element Gup of the U-phase, arm is in the ON state, whereas the n-side switching element Gun of the U-phase arm is in the OFF state. Likewise within the time period T71, the P-side switching element Gyp of the V-phase arm is in the OFF state, whereas the n-side switching element Gvn of the V-phase arm is in the ON state. Likewise within the time period T71, the P-side switching element Gwp of the W-phase arm is in the OFF state, whereas the n-side switching element Gwn of the W-phase arm is in the ON state.

In this case, as shown in FIG. 7B, for example, part of the V-phase current Iv flowing from the motor generator 14 toward the inverter 13 returns as the W-phase current Iw from the inverter 13 to the motor generator 14. The other part of the V-phase current Iv flowing from the motor generator 14 toward the inverter 13 flows as the U-phase current Iu through the smoothing capacitor 12 to the U-phase arm. In other words, within the time period T71, the U-phase current Iu matches the capacitor current Ic itself.

Where various states of the switching elements of the inverter 13 that differ from those within the time period T71 are also considered, it can be found that the capacitor current Ic matches the phase current of the phase of the p-side switching element which is independently in the ON state among the three p-side switching elements, or the phase current of the phase of the n-side switching element which is independently in the ON state (however, the polarity thereof is reversed) among the three n-side switching elements. Taking into account that the switching state of the three p-side switching elements and three n-side switching elements changes moment by moment, the phase current matching the capacitor current Ic also changes moment by moment. In other words, the phase current of a certain specific phase hardly matches the capacitor current Ic over a long period of time. Therefore, the capacitor current phase which is the phase of the main phase current determining the capacitor current Ic is actually the phase of the phase current for which the time period of matching the capacitor current Ic within a predetermined time period is the longest.

Accordingly, when explaining the operation of specifying the phase of the phase current for which the time period of matching the capacitor current Ic is the longest, the attention will be focused on an example of the three-phase voltage command signals for which the relationships of (signal level of the W-phase voltage command signal Vw)<(signal level of the U-phase voltage command signal Vu)<(signal level of the V-phase voltage command signal. Vv) and |(signal level of the V-phase voltage command signal Vv)−(signal level of the U-phase voltage command signal Vu)|<|(signal level of the W-phase voltage command signal Vw)−(signal level of the U-phase voltage command signal Vu)| are valid, as shown in FIG. 8. In particular, in FIG. 8, the attention is focused on the shortest time period corresponding to the carrier signal C of one period.

As shown in FIG. 8, in the shortest time period corresponding to the carrier signal C of one period, there is a time period in which the V-phase current Iv matches the capacitor current Ic and a time period in which the W-phase current Iw matches the capacitor current Ic. In other words, it is apparent that the phase current corresponding to the phase of the phase voltage command signal with the maximum signal level, and the phase current corresponding to the phase of the phase voltage command signal with the minimum signal level match the capacitor current Ic.

In this case, as shown in FIG. 8, the time period in which the W-phase current Iw matches the capacitor current Ic is longer than the time period in which the V-phase current Iv matches the capacitor current Ic. In other words, the time period in which the W-phase current Iw matches the capacitor current Ic is the longest. In other words, it is clear that the time period in which the phase current corresponding to the phase of the phase voltage command signal (the W-phase voltage command signal Vw in the example shown in FIG. 8) with a larger absolute value of the difference from the signal level of the center-phase voltage command signal (U-phase voltage command signal Vu in the example shown in FIG. 8) matches the capacitor current Ic is the longest.

Thus, the capacitor current phase specifying unit 156 can specify the capacitor current phase based on the magnitude relationship between the three phase command signals (in other, words, the U-phase voltage command signal Vu, V-phase voltage command signal Vv, and W-phase voltage command signal Vw).

Referring again to FIGS. 2 and 3, after the capacitor current phase specifying unit 156 has specified the capacitor current phase, a correction amount is calculated for correcting the detection signal of the V-phase current sensor 14v or the W-phase current sensor 14w for detecting the phase current of the capacitor current phase.

More specifically, where it is specified that the V phase is the capacitor current phase, the V-phase correction amount calculation unit 157v calculates the increase/decrease amount (change amount) of the terminal voltage detection signal VH* that is to be inputted to the V-phase correction amount calculation unit 157v within the time period in which the V phase is specified as the capacitor current phase (step S22). For example, the V-phase correction amount calculation unit 157v may calculate as the increase/decrease amount of the terminal voltage detection signal VH* a difference between the terminal voltage detection signal VH* at the start point of the time period in which the V phase is specified as the capacitor current phase and the terminal voltage detection signal VH* at the end point of the time period in which the V phase is specified as the capacitor current phase.

Likewise, where it is specified that the W phase is the capacitor current phase, the W-phase correction amount calculation unit 157w calculates the increase/decrease amount (change amount) of the terminal voltage detection signal VH* that is to be inputted to the W-phase correction amount calculation unit 157w within the time period in which the W phase is specified as the capacitor current phase (step S22). For example, the W-phase correction amount calculation unit 157w may calculate as the increase/decrease amount of the terminal voltage detection signal VH* a difference between the terminal voltage detection signal VH* at the start point of the time period in which the W phase is specified as the capacitor current phase and the terminal voltage detection signal VH* at the end point of the time period in which the W phase is specified as the capacitor current phase.

Then, the V-phase correction amount calculation unit 157v calculates the V-phase correction amount Cv for correcting the V-phase current detection signal Iv* such that the increase/decrease amount of the terminal voltage detection signal VH* calculated in step S22 (that is, the increase/decrease amount of the terminal voltage detection signal VH* within the time period in which the V phase is specified as the capacitor current phase) becomes zero (step S23). In this case, the V-phase correction amount calculation unit 157v may calculate the V-phase correction amount Cv, for example, by performing the PI control based on the increase/decrease amount of the terminal voltage detection signal VH* (or based on the terminal voltage detection signal VH* itself).

The polarity of the V-phase correction amount Cv, which is thus calculated, may be, for example, the polarity of the V-phase current Iv within the time period in which the V phase is specified as the capacitor current phase and a polarity corresponding to the change trend of the terminal voltage detection signal VH*.

For example, as shown in the abovementioned FIG. 5A, when an error αv of a positive polarity (in other words, an error causing a state in which the V-phase current detection signal Iv* which is larger than the actual V-phase current Iv is detected) is included in the V-phase current detection signal Iv*, the terminal voltage VH (the terminal voltage detection signal VH*) increases in a state in which the polarity of the V phase signal is a positive polarity, and the terminal voltage VH (the terminal voltage detection signal VH*) decreases in a state in which the polarity of the V phase signal is a negative polarity. In this case, in order to correct the error αv of a positive polarity that is included in the V-phase current detection signal Iv*, it is preferred that the V-phase correction amount Cv of a negative polarity be calculated that can decrease the V-phase current detection signal Iv* as a result of addition to the V-phase current detection signal Iv*. In other words, when the polarity of the V-phase current is a positive polarity and the terminal voltage detection signal VH* increases, or when the polarity of the V-phase current is a negative polarity and the terminal voltage detection signal VH* decreases, it is preferred that the V-phase correction amount Cv of a negative polarity be calculated.

Meanwhile, when an error αv of a negative polarity (in other words, an error causing a state in which the V-phase current detection signal Iv* which is less than the actual V-phase current Iv is detected) is included in the V-phase current detection signal Iv*, the terminal voltage VH (the terminal voltage detection signal VH*) decreases in a state in which the polarity of the V-phase signal is a positive polarity, and the terminal voltage VH (the terminal voltage detection signal VH*) increases in a state in which the polarity of the V phase signal is a negative polarity. In this case, in order to correct the error αv of a negative polarity that is included in the V-phase current detection signal Iv*, it is preferred that the V-phase correction amount Cv of a positive polarity be calculated that can increase the V-phase current detection signal Iv* as a result of addition to the V-phase current detection signal Iv*. In other words, when the polarity of the V-phase current is a positive polarity and the terminal voltage detection signal VH* decreases, or when the polarity of the V-phase current is a negative polarity and the terminal voltage detection signal VH* increases, it is preferred that the V-phase correction amount Cv of a positive polarity be calculated.

Further, the size of the V-phase correction amount Cv which is thus calculated may correspond, for example, to the change amount of the terminal voltage detection signal VH* within the time period in which the V phase is specified as the capacitor current phase. For example, the V-phase correction amount Cv may increase with the increase of the change amount of the terminal voltage detection signal VH* within the time period in which the V phase is specified as the capacitor current phase. In other words, the V-phase correction amount Cv may decrease with the decrease of the change amount of the terminal voltage detection signal VH* within the time period in which the V phase is specified as the capacitor current phase.

Likewise, the W-phase correction amount calculation unit 157w calculates the W-phase correction amount Cw for correcting the W-phase current detection signal Iw* such that the increase/decrease amount (calculated in step S22) of the terminal voltage detection signal VH* within the time period in which the W phase is specified as the capacitor current phase becomes zero (step S23). In this case, the W-phase correction amount calculation unit 157w may calculate the W-phase correction amount Cw, for example, by performing the PI control based on the increase/decrease amount of the terminal voltage detection signal VH* (or based on the terminal voltage detection signal VH* itself).

The polarity of the W-phase correction amount Cw, which is thus calculated, may be, for example, the polarity of the W-phase current Iw within the time period in which the W phase is specified as the capacitor current phase and a polarity corresponding to the change trend of the terminal voltage detection signal VH*. The details are the same as in the case of polarity of the V-phase correction amount Cv. Further, the size of the W-phase correction amount Cw which is thus calculated may correspond, for example, to the change amount of the terminal voltage detection signal VH* within the time period in which the W phase is specified as the capacitor current phase. The details are the same as in the case of polarity of the V-phase correction amount Cv.

Figure 9A:
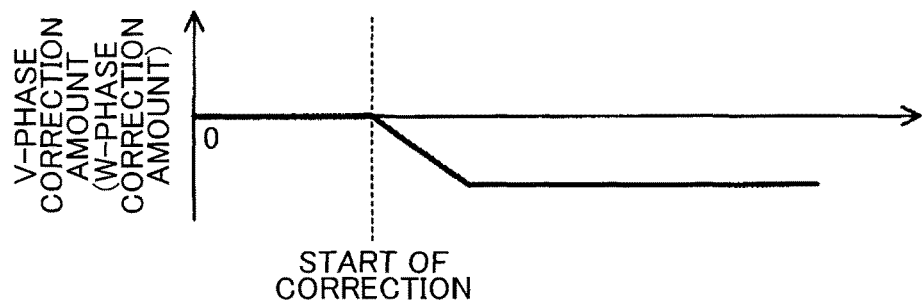
FIGS. 9A, 9B, and 9C are graphs showing the changing modes of the V-phase correction amount (W-phase correction amount), V-phase current detection signal (W-phase current detection signal), and terminal voltage in the case of correcting the V-phase current detection signal (W-phase current detection signal)
Figure 9B:
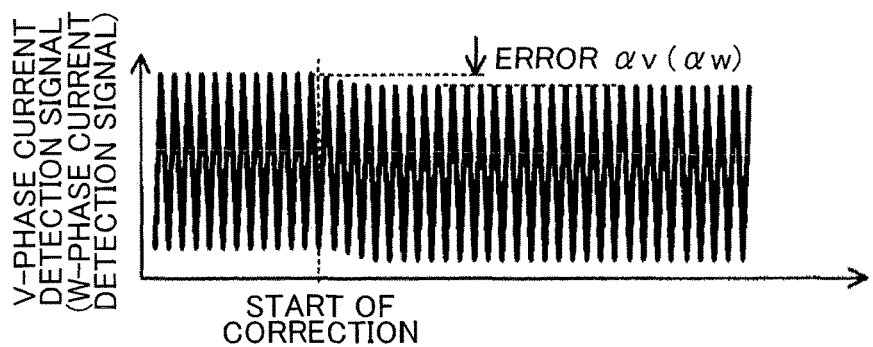
Figure 9C:
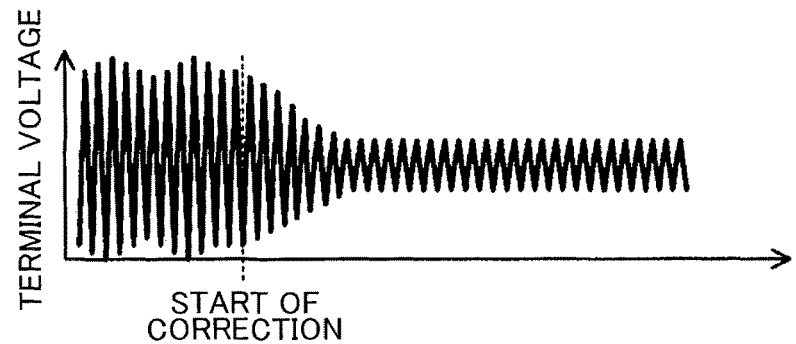

Then, the V-phase adder 158v adds the V-phase correction amount Cv, which has been calculated by the V-phase correction amount calculation unit 157v in step S23 (see FIG. 9A), to the V-phase current detection signal Iv* (step S24). It is preferred that the V-phase adder 158v continue adding the V-phase correction amount Cv, which has been calculated within the time period in which the V phase is specified as the capacitor current phase, to the V-phase current detection signal Iv* even within a time period in which the V phase is not specified as the capacitor current phase. The error αv included in the V-phase current detection, signal Iv* is thus corrected, as shown in FIG. 9B. As a result, as shown in FIG. 9C, the increase/decrease amount of the terminal voltage VH of the smoothing capacitor 12 becomes substantially zero.

Likewise, the W-phase adder 158w adds the W-phase correction amount Cw, which has been calculated by the W-phase correction amount calculation unit 157W in step S23 (see FIG. 9A), to the W-phase current detection signal Iw* (step S24). It is preferred that the W-phase adder 158w continue adding the W-phase correction amount Cw, which has been calculated within the time period in which the W phase is specified as the capacitor current phase, to the W-phase current detection signal Iw* even within a time period in which the W phase is not specified as the capacitor current phase. The error αw included in the W-phase current detection signal Iw* is thus corrected, as shown in FIG. 9B. As a result, as shown in FIG. 9C, the increase/decrease amount of the terminal voltage VH of the smoothing capacitor 12 becomes substantially zero.

With the inverter control operation of the first embodiment, which is explained hereinabove, the ECU 15 can advantageously correct the V-phase current detection signal Iv* which is the detection signal of the V-phase current sensor 14v. In other words, the ECU 15 can advantageously correct the error αv included in the V-phase current detection signal Iv*. Likewise, the ECU 15 can advantageously correct the W-phase current detection signal Iw* which is the detection signal of the W-phase current sensor 14w. In other words, the ECU 15 can advantageously correct the error αw included in the W-phase current detection signal Iw*.

In particular, in the first embodiment, the ECU 15 specifies the capacitor current phase. Therefore, even when the vehicle 1 is provided with a plurality of current sensors (in other words, the V-phase current sensor 14v and the W-phase current sensor 14w), the detection signals of the current sensors can be individually corrected so as to correct individually the errors included in the detection signals of the current sensors. In other words, the ECU 15 can correct individually the error αv included in the V-phase current detection signal Iv*, while producing no or practically no effect on the W-phase current detection signal Iw*. Likewise, the ECU 15 can correct individually the error αw included in the W-phase current detection signal Iw*, while producing no or practically no effect on the V-phase current detection signal Iv*.

Furthermore, in the first embodiment, the ECU 15 can advantageously correct the V-phase current detection signal Iv* and the W-phase current detection signal Iw* as long as the ECU 15 generates the three-phase voltage command signals.

In the explanation above, the vehicle 1 is provided with two current sensors (in other words, the V-phase current sensor 14v and the W-phase current sensor 14w). However, the vehicle 1 may be also provided with one, or three or more current sensors. For example, the vehicle 1 may be provided with at least one current sensor for detecting, at least one of the U-phase current Iu, V-phase current Iv, and W-phase current Iw. In this case, the ECU 15 may be equipped with the correction amount calculation unit 157 and the adder 158 corresponding to the phase for which the current sensor is provided. In other words, the ECU 15 may not be equipped with the correction amount calculation unit 157 and the adder 158 corresponding to the phase for which the current sensor is not provided.

Figure 10:
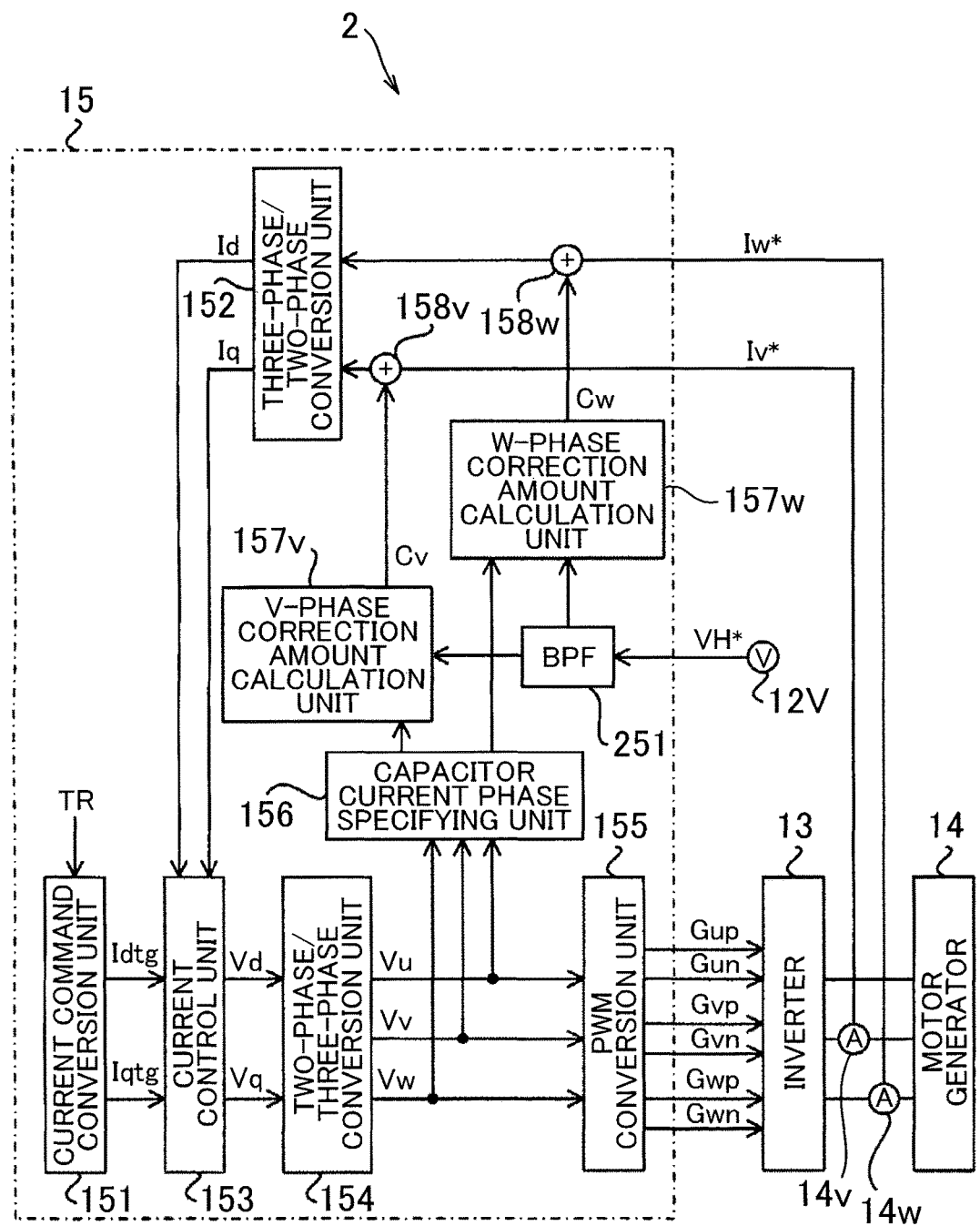
FIG. 10 is a block diagram showing the configuration of the vehicle of the second embodiment.

A vehicle 2 of the second embodiment will be explained below with reference to FIG. 10. FIG. 10 is a block diagram showing the configuration of the vehicle 2 of the second embodiment. Since the constituent elements and operations in the vehicle 2 of the second embodiment are the same as the constituent elements and operations in the vehicle 1 of the first embodiment, they are assigned with the same reference numerals and step numbers and the detailed explanation thereof is herein omitted.

As shown in FIG. 10, the vehicle 2 of the second embodiment differs from the vehicle 1 of the first embodiment in that a band pass filter (BPF) 251, which is a specific example of the "extraction device", is further provided. Other constituent elements of the vehicle 2 of the second embodiment are the same as other constituent elements of the vehicle 1 of the first embodiment.

The BPF 251 extracts a voltage component of a specific frequency from the terminal voltage detection signal VH* (that is, the terminal voltage VH detected by the voltage sensor 12v).

The voltage component of a specific frequency extracted by the BPF 251 is, for example, a voltage component having a frequency equal to the frequency of the three-phase voltage command signals. The voltage component having a frequency equal to the frequency of the three-phase voltage command signals substantially matches the change component of the terminal voltage VH caused by at least one of the error (more specifically, the offset error) αv included in the V-phase current detection signal Iv* and the error (more specifically, the offset error) αw included in the W-phase current detection signal Iw*.

The voltage component of a specific frequency extracted by the BPF 251 is, for example, a voltage component having a frequency which is twice the frequency of the three-phase voltage command signals. The voltage component having a frequency which is twice the frequency of the three-phase voltage command signals substantially matches the change component of the terminal voltage VH caused by at least one of the error (more specifically, the gain error) αv included in the V-phase current detection signal Iv* and the error (more specifically, the gain error) αw included in the W-phase current detection signal Iw*.

In the second embodiment, the V-phase correction amount calculation unit 157v calculates the increase/decrease amount (change amount) of the voltage component of a specific frequency that is to be inputted to the V-phase correction amount calculation unit 157v within the time period in which the V phase is specified as the capacitor current phase. Then, the V-phase correction amount calculation unit 157v calculates the V-phase correction amount Cv for correcting the V-phase current detection signal Iv* such that the increase/decrease amount of the voltage component becomes zero.

In this case, for example, when the voltage component with a specific frequency is the voltage component having a frequency same as the frequency of the three-phase voltage command signals, the V-phase correction amount calculation unit 157v can calculate the V-phase correction amount Cv necessary for correcting the error (more specifically, the offset error) αv included in the V-phase current detection signal Iv*. Alternatively, for example, when the voltage component with a specific frequency is the voltage component having a frequency twice the frequency of the three-phase voltage command signals, the V-phase correction amount calculation unit 157v can calculate the V-phase correction amount Cv necessary for correcting the error (more specifically, the gain error) αv included in the V-phase current detection signal Iv*.

Likewise, the W-phase correction amount calculation unit 157w calculates the increase/decrease amount (change amount) of the voltage component of a specific frequency that is to be inputted to the W-phase correction amount calculation unit 157w within the time period in which the W phase is specified as the capacitor current phase. Then, the W-phase correction amount calculation unit 157w calculates the W-phase correction amount Cw for correcting the W-phase current detection signal Iw* such that the increase/decrease amount of the voltage component becomes zero.

In this case, for example, when the voltage component with a specific frequency is the voltage component having a frequency same as the frequency of the three-phase voltage command signals, the W-phase correction amount calculation unit 157w can calculate the W-phase correction amount Cw necessary for correcting the error (more specifically, the offset error) αw included in the W-phase current detection signal Iw*. Alternatively, for example, when the voltage component with a specific frequency is the voltage component having a frequency twice the frequency of the three-phase voltage command signals, the W-phase correction amount calculation unit 157w can calculate the W-phase correction amount Cw necessary for correcting the error (more specifically, the gain error) αw included in the W-phase current detection signal Iw*.

Thus, in the second embodiment, the ECU 15 also can advantageously correct the V-phase current detection signal Iv* and the W-phase current detection signal Iw*, in the same manner as in the first embodiment. In particular, in the second embodiment, when the V-phase current detection signal Iv* includes a plurality of errors αv (for example, the aforementioned offset error and gain error), the ECU 15 can individually correct each of the plurality of errors αv. Likewise, when the W-phase current detection signal Iw* includes a plurality of errors αw (for example, the aforementioned offset error and gain error), the ECU 15 can individually correct each of the plurality of errors αw.

Figure 11:
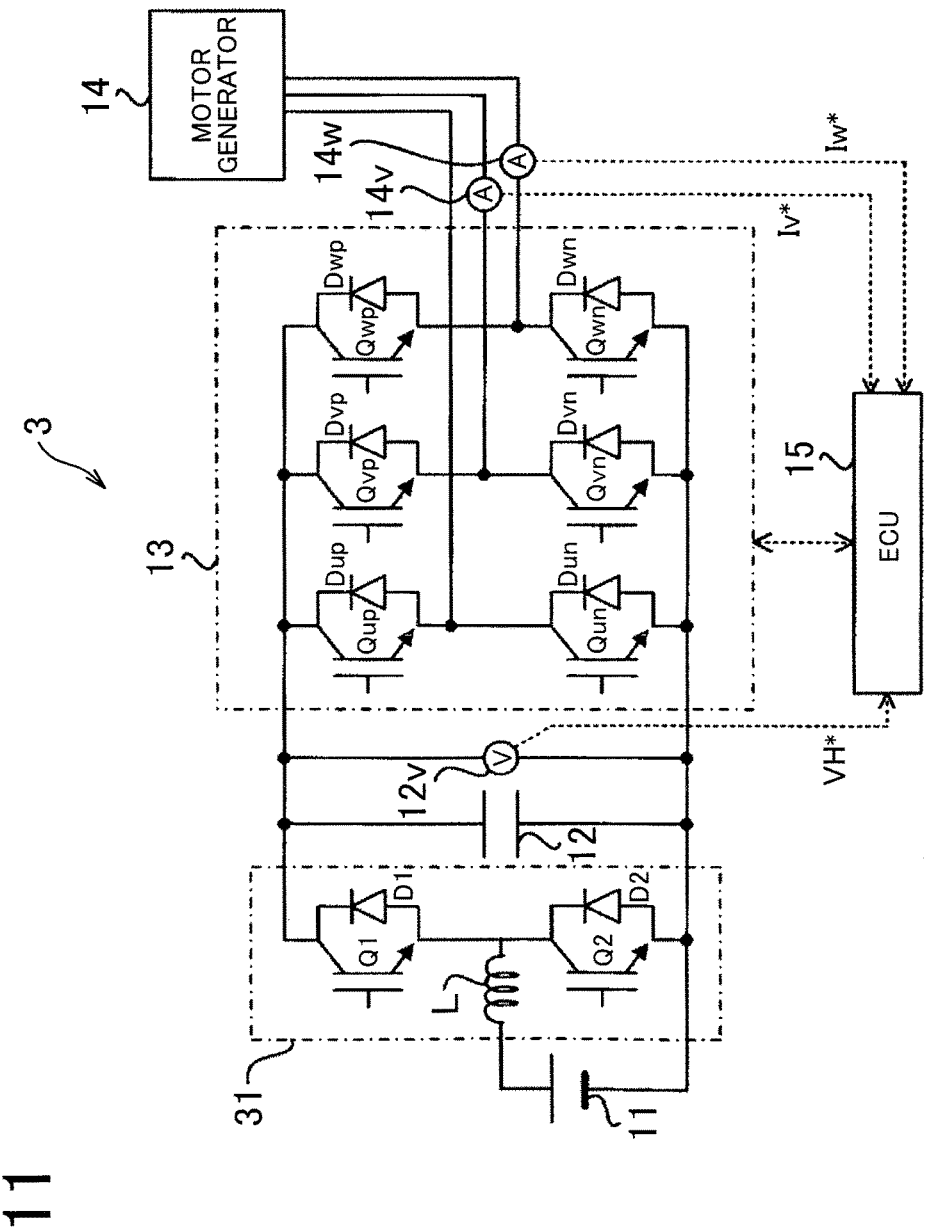
FIG. 11 is a block diagram showing the configuration of the vehicle of the third embodiment.

The third embodiment will be explained below with reference to FIG. 11. FIG. 11 is a block diagram showing the configuration of a vehicle 3 of the third embodiment. Since the constituent elements and operations in the vehicle 3 of the third embodiment are the same as the constituent elements and operations in the vehicle 1 of the first embodiment and the vehicle 2 of the second embodiment, they are assigned with same reference numerals and step numbers and the detailed explanation thereof is herein omitted.

As shown in FIG. 11, the vehicle 3 of the third embodiment differs from the vehicle 1 of the first embodiment in that a voltage-boosting converter 31, which is a specific example of the "voltage converter", is further provided. Other constituent elements of the vehicle 3 of the third embodiment are the same as other constituent elements of the vehicle 1 of the first embodiment.

The voltage-boosting converter 31 performs a voltage boosting operation of raising the voltage value of the DC power supplied from the DC power supply 11 to a desired voltage value. The voltage value after the voltage boosting operation performed by the voltage-boosting converter 31 matches the terminal voltage VH of the smoothing capacitor 12. Therefore, the voltage-boosting converter 31 typically performs the voltage boosting operation such that the terminal voltage detection signal VH* output from the voltage sensor 12v matches the desired voltage value.

However, where the voltage-boosting converter 31 performs the voltage boosting operation such that the terminal voltage detection signal VH* matches the desired voltage value, the terminal voltage detection signal VH* does not change even when the error αv is included in the V-phase current detection signal Iv*. Therefore, even when the error αv is included in the V-phase current detection signal Iv*, it is difficult for the ECU 15 to correct the error αv based on the terminal voltage detection signal VH*.

Likewise, where the voltage-boosting converter 31 performs the voltage boosting operation such that the terminal voltage detection signal VH* matches the desired voltage value, the terminal voltage detection signal VH* does not change even when the error αw is included in the W-phase current detection signal Iw*. Therefore, even when the error αw is included in the W-phase current detection signal Iw*, it is difficult for the ECU 15 to correct the error αw based on the terminal voltage detection signal VH*.

Accordingly, in the third embodiment, the voltage-boosting converter 31 performs the voltage boosting operation such that a voltage component obtained by removing the change component of the terminal voltage VH, which is caused by the error αv and the error αw, from the terminal voltage detection signal VH* matches the desired voltage value. For example, the voltage-boosting converter 31 performs the voltage boosting operation such that a voltage component obtained by removing both the voltage component having a frequency same as that of the three-phase voltage command signals (that is, the change component of the terminal voltage VH, which is caused by the offset error) and the voltage component having a frequency twice the frequency of the three-phase voltage command signals (that is the change component of the terminal voltage VH, which is caused by the gain error) from the terminal voltage detection signal VH* matches the desired voltage value. The operation of removing the change component of the terminal voltage VH, which is caused by the error αv and the error αw, from the terminal voltage detection signal VH* may be performed, for example, by a notch filter (or a band elimination filter (BEF)).

As a result, even when the voltage-boosting converter 31 performs the voltage boosting operation in such a mode, where the error αv is included in the V-phase current detection signal Iv*, the terminal voltage detection signal VH* changes. Therefore, the ECU 15 can correct the V-phase current detection signal Iv* based on the terminal voltage detection signal VH* even when the voltage-boosting converter 31 performs the voltage boosting operation.

Likewise, even when the voltage-boosting converter 31 performs the voltage boosting operation in such a mode, where the error αw is included in the W-phase current detection signal Iw*, the terminal voltage detection signal VH* changes. Therefore, the ECU 15 can correct the W-phase current detection signal Iw* based on the terminal voltage detection signal VH* even when the voltage-boosting converter 31 performs the voltage boosting operation.

Thus, also in the third embodiment, similarly to the first embodiment, the ECU 15 can advantageously correct the V-phase current detection signal Iv* and the W-phase current detection signal Iw*. In particular, in the third embodiment, the ECU 15 can advantageously correct the V-phase current detection signal Iv* and the W-phase current detection signal Iw* even when the vehicle 3 is provided with the voltage-boosting converter 31.

Figure 12:
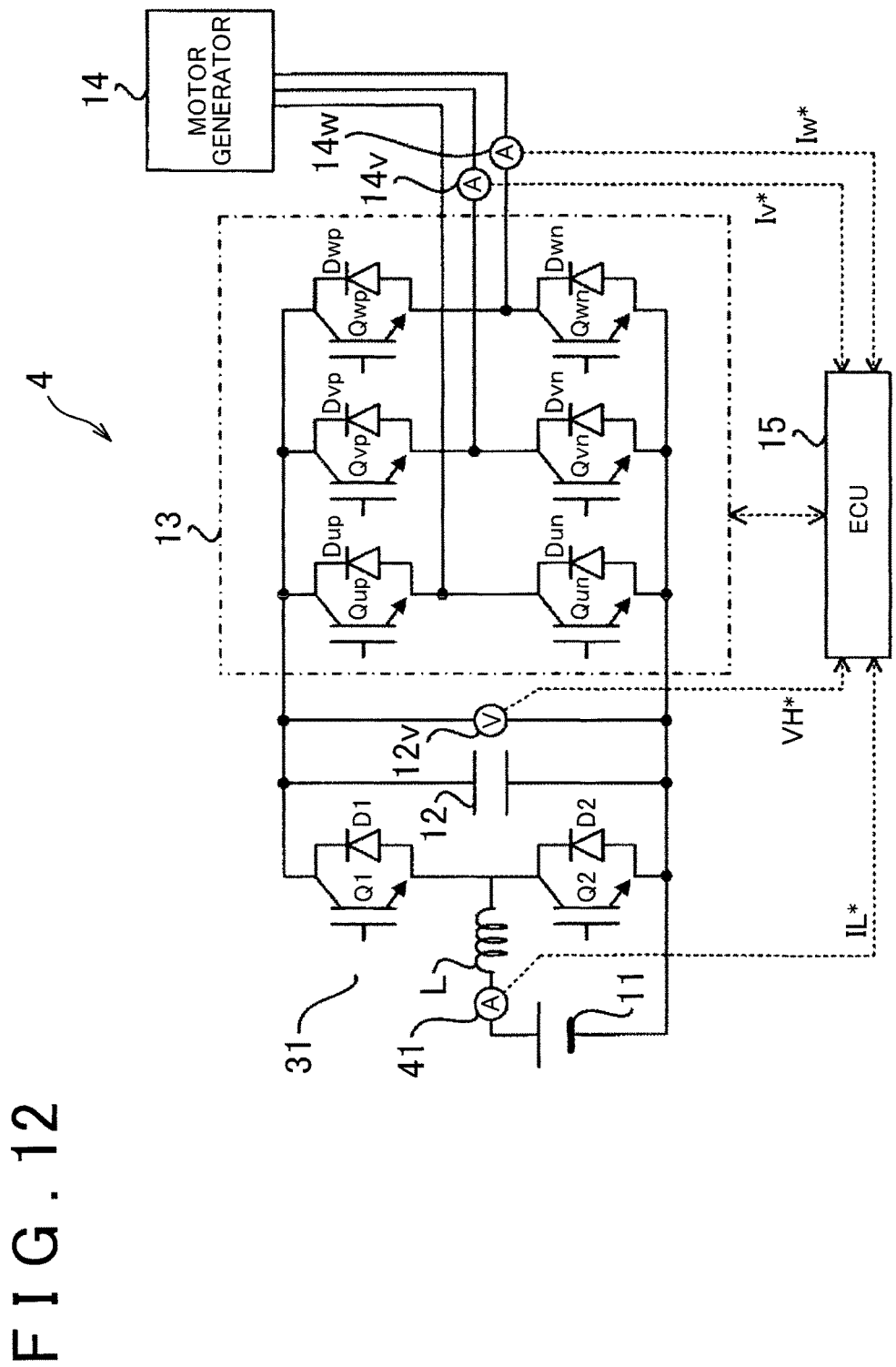
FIG. 12 is a block diagram showing the configuration of the vehicle of the fourth embodiment.

The fourth embodiment will be explained below with reference to FIG. 12. FIG. 12 is a block diagram showing the configuration of a vehicle 4 of the fourth embodiment. Since the constituent elements and operations in the vehicle 4 of the fourth embodiment are the same as the constituent elements and operations in the vehicle 1 of the first embodiment through the vehicle 3 of the third embodiment, they are assigned with same reference numerals and step numbers and the detailed explanation thereof is herein omitted.

As shown in FIG. 12, the vehicle 4 of the fourth embodiment differs from the vehicle 1 of the first embodiment in that the voltage-boosting converter 31, which is a specific example of the "power converter", is further provided. Furthermore, the vehicle 4 of the fourth embodiment also differs from the vehicle 1 of the first embodiment in that a power supply current sensor 41 is further provided. Other constituent elements of the vehicle 4 of the fourth embodiment are the same as other constituent elements of the vehicle 1 of the first embodiment.

The voltage-boosting converter 31 is identical to the voltage-boosting converter 31 provided in the vehicle 3 of the third embodiment. As described hereinabove, the voltage-boosting converter 31 performs a voltage boosting operation such that the terminal voltage detection signal VH* output from the voltage sensor 12v matches the desired voltage value.

The power supply current sensor 41 detects a power supply current IL flowing from the DC power supply 11 to the voltage-boosting converter 31 (in other words, from the DC power supply 11 via the voltage-boosting converter 31 to the inverter 13). The detection signal of the power supply current sensor 41 (called hereinbelow, as appropriate, "power supply current detection signal IL*") is referred to, as appropriate, by the ECU 15.

In this case, as mentioned hereinabove, where the voltage-boosting converter 31 performs the voltage boosting operation such that the terminal voltage detection signal VH* matches the desired voltage value, the terminal voltage detection signal VH*, does not change even when the error αv is included in the V-phase current detection signal Iv*. Therefore, even when the error αv is included in the V-phase current detection signal Iv*, it is difficult for the ECU 15 to correct the error αv based on the terminal voltage detection signal VH*. The same is true with respect to the error αw included in the W-phase current detection signal Iw*.

Meanwhile, the terminal voltage VH of the smoothing capacitor 12 includes both the change component (voltage component) caused by the voltage boosting operation performed by the voltage-boosting converter 31 and the change component (voltage component) of the terminal voltage VH caused by the error αv and the error αw. Therefore, the voltage component obtained by removing the change component caused by the voltage boosting operation performed by the voltage-boosting converter 31 from the terminal voltage detection signal VH* substantially matches the change component of the terminal voltage VH caused by the error αv and the error αw. Therefore, even when the voltage-boosting converter 31 performs the voltage boosting operation, where the error αv is included in the V-phase current detection signal Iv*, the voltage component obtained by removing the change component caused by the voltage boosting operation performed by the voltage-boosting converter 31 from the terminal voltage detection signal VH* changes. Likewise, even when the voltage-boosting converter 31 performs the voltage boosting operation, where the error αw is included in the W-phase current detection signal Iw*, the voltage component obtained by removing the change component caused by the voltage boosting operation performed by the voltage boosting converter 31 from the terminal voltage detection signal VH* changes.

Accordingly, in the fourth embodiment, the ECU 15 (more specifically, the V-phase correction amount detection unit 157v provided in the ECU 15) calculates the V-phase correction amount Cv for correcting the V-phase current detection signal Iv* such that the increase/decrease amount of the voltage component obtained by removing the change component caused by the voltage boosting operation performed by the voltage-boosting converter 31 from the terminal voltage detection signal VH*, instead of the increase/decrease amount of the terminal voltage detection signal VH*, becomes zero. As a result, the ECU 15 can correct the V-phase current detection signal Iv* so as to eliminate the error αv, even when the voltage-boosting converter 31 performs the voltage boosting operation.

Likewise, the ECU 15 (more specifically, the W-phase correction amount detection unit 157w provided in the ECU 15) calculates the W-phase correction amount Cw for correcting the W-phase current detection signal Iw* such that the increase/decrease amount of the voltage component obtained by removing the change component caused by the voltage boosting operation performed by the voltage-boosting converter 31 from the terminal voltage detection signal VH*, instead of the increase/decrease amount of the terminal voltage detection signal VH*, becomes zero. As a result, the ECU 15 can correct the W-phase current detection signal Iw* so as to eliminate the error αw, even when the voltage-boosting converter 31 performs the voltage boosting operation.

The ECU 15 can calculate the change component caused by the voltage boosting operation performed by the voltage-boosting converter 31 by integrating the power supply current detection signal IL*, which is the detection signal of the current sensor 41, and dividing the integrated power supply current detection signal IL* by the electrostatic capacity of the smoothing capacitor. In other words, the voltage component obtained by dividing the integrated power supply current detection signal IL* by the electrostatic capacity of the smoothing capacitor matches the change component caused by the voltage boosting operation performed by the voltage-boosting converter 31. However, the ECU 15 may also calculate the change component caused by the voltage boosting operation performed by the voltage-boosting converter 31 by other modes.

Thus, in the fourth embodiment, the ECU 15 can advantageously correct the V-phase current detection signal Iv* and the W-phase current detection signal Iw* in the same manner as in the first embodiment. In particular, in the fourth embodiment, the ECU 15 can advantageously correct the V-phase current detection signal Iv* and the W-phase current detection signal Iw* even when the vehicle 4 is provided with the voltage-boosting converter 31.

Figure 13:
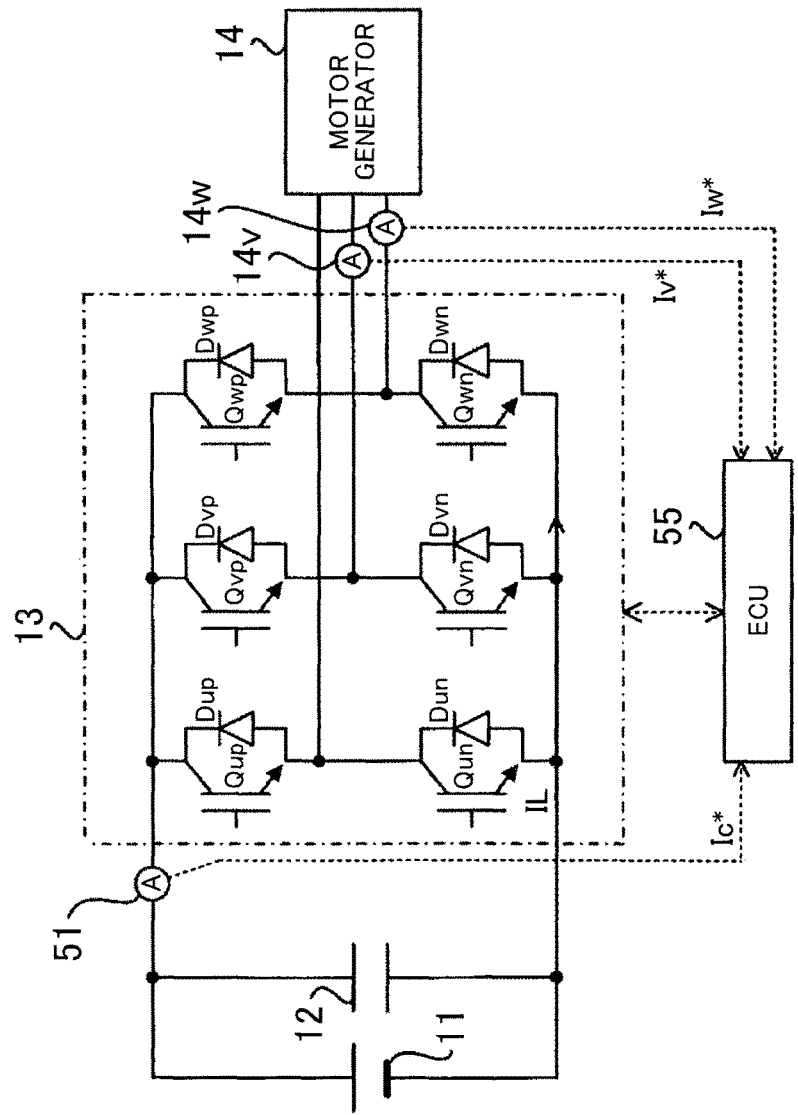
FIG. 13 is a block diagram showing the configuration of the vehicle of the fifth embodiment.
Figure 14:
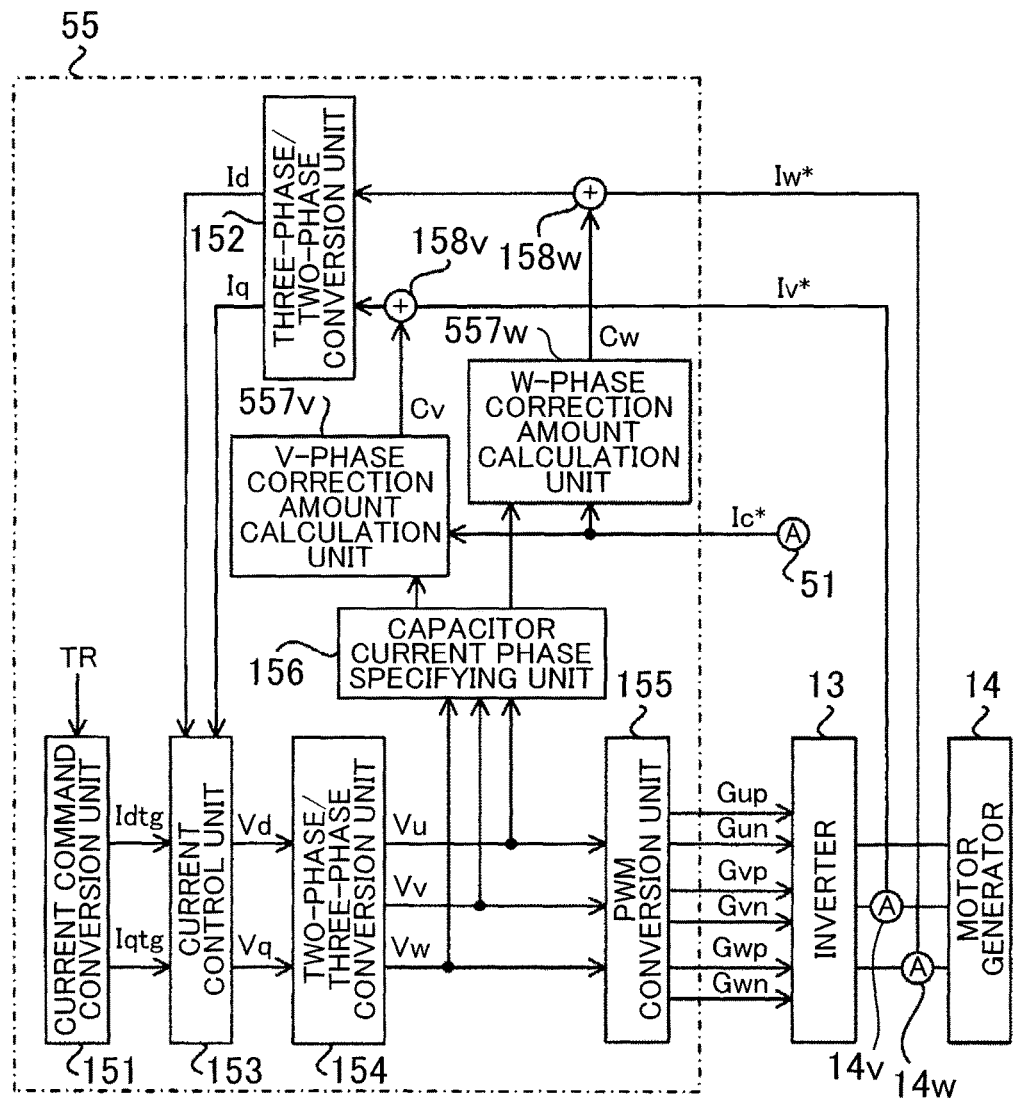
FIG. 14 is a block diagram showing the configuration of the ECU (in particular the configuration for controlling the operation of the inverter) in the fifth embodiment.

The fifth embodiment will be explained below with reference to FIGS. 13 and 14. FIG. 13 is a block diagram showing the configuration of a vehicle 5 of the fifth embodiment. FIG. 14 is a block diagram showing the configuration of a ECU 55 of the fifth embodiment (in particular, the configuration for controlling the operation of the inverter 13). Since the constituent elements and operations in the vehicle 5 of the fifth embodiment are the same as the constituent elements and operations in the vehicle 1 of the first embodiment through the vehicle 4 of the fourth embodiment, they are assigned with same reference numerals and step numbers and the detailed explanation thereof is therein omitted.

As shown in FIG. 13, the vehicle 5 of the fifth embodiment differs from the vehicle 1 of the first embodiment in that a capacitor current sensor 51 that detects the capacitor current Ic is further provided. Furthermore, the vehicle 5 of the fifth embodiment also differs from the vehicle 1 of the first embodiment in that the voltage sensor 12v that detects the terminal voltage VH may not be provided. The vehicle 5 of the fifth embodiment also differs from the vehicle 1 of the first embodiment in that the ECU 55 refers to the detection signal of the capacitor current sensor 51 (called hereinbelow, as appropriate, "capacitor current detection signal Ic*"), instead of the terminal voltage detection signal VH*. Other constituent elements of the vehicle 5 of the fifth embodiment are the same as other constituent elements of the vehicle 1 of the first embodiment.

As shown in FIG. 14, the ECU 55 of the fifth embodiment differs from the ECU 15 of the first embodiment, in which the V-phase correction amount calculation unit 157v and the W-phase correction amount calculation unit 157w refer to the terminal voltage detection signal VH*, in that a V-phase correction amount calculation unit 557v and a W-phase correction amount calculation unit 557w respectively refer to the capacitor current detection signal Ic*. Other constituent elements of the ECU 55 of the fifth embodiment are the same as other constituent elements of the ECU 15 of the first embodiment.

The V-phase correction amount calculation unit 557v calculates the V-phase correction amount Cv based on the capacitor current detection signal Ic* that is to be inputted to the V-phase correction amount calculation unit 557v within the time period in which the capacitor current phase is specified as the V phase. More specifically, it is indicated hereinabove that when the error αv is included in the V-phase current detection signal Iv*, the error αv may cause the increase/decrease of the capacitor current detection signal Ic* (see FIGS. 5A and 5B). Therefore, in the fifth embodiment, the V-phase correction amount calculation unit 557v may calculate the V-phase correction amount Cv such that the capacitor current detection signal Ic* within the time period in which the capacitor current phase is specified as the V phase changes in the same mode in some or all of a plurality of time periods in which the capacitor current phase is specified as the V phase. In other words, the V-phase correction amount calculation unit 557v may calculate the V-phase correction amount Cv such that the capacitor current detection signal Ic* within the time period in which the capacitor current phase is specified as the V phase matches the desired current value.

For example, when the V phase is specified as the capacitor current phase, the V-phase correction amount calculation unit 557v may compare the capacitor current detection signal Ic* that is to be inputted to the V-phase correction amount calculation unit 557v within the present time period in which the V phase is specified as the capacitor current phase (referred to hereinbelow as "present capacitor current detection signal Ic*") with the capacitor current detection signal Ic* that is to be inputted to the V-phase correction amount calculation unit 557v within the previous time period in which the V phase has been specified as the capacitor current phase (referred to hereinbelow as "previous capacitor current detection signal Ic*"). Then, the V-phase correction amount calculation unit 557v may calculate the V-phase correction amount Cv such that the present capacitor current detection signal Ic* becomes equal to the previous capacitor current detection signal Ic*. In this case, the V-phase correction amount calculation unit 557v may calculate the V-phase correction amount Cv, without performing, for example, the PI control.

Likewise, the W-phase correction amount calculation unit 557w calculates the W-phase correction amount Cw based on the capacitor current detection signal Ic* that is to be inputted to the W-phase correction amount calculation unit 557w within the time period in which the capacitor current phase is specified as the W phase. In other words, the W-phase correction amount calculation unit 557w may calculate the W-phase correction amount Cw such that the capacitor current detection signal Ic* within the time period in which the capacitor current phase is specified as the W phase changes in the same mode in some or all of a plurality of time periods in which the capacitor current phase is specified as the W phase. In other words, the W-phase correction amount calculation unit 557w may calculate the W-phase correction amount Cw such that the capacitor current detection signal Ic* within the time period in which the capacitor current phase is specified as the W phase matches the desired current value.

For example, when the W phase is specified as the capacitor current phase, the W-phase correction amount calculation unit 557w may compare the capacitor current detection signal Ic* that is to be inputted to the W-phase correction amount calculation unit 557w within the present time period in which the W phase is specified as the capacitor current phase (referred to hereinbelow as "present capacitor current detection signal Ic*") with the capacitor current detection signal Ic* that is inputted to the W-phase correction amount calculation unit 557w within the previous time period in which the W phase has been specified as the capacitor current phase (referred to hereinbelow as "previous capacitor current detection signal Ic*"). Then, the W-phase correction amount calculation unit 557w may calculate the W-phase correction amount Cw such that the present capacitor current detection signal Ic* becomes equal to the previous capacitor current detection signal Ic*. In this case, the W-phase correction amount calculation unit 557w may calculate the W-phase correction amount Cw, without performing, for example, the PI control.

Thus, in the fifth embodiment, the ECU 15 can advantageously correct the V-phase current detection signal Iv* and the W-phase current detection signal Iw*, in the same manner as in the first embodiment. In particular, in the fifth embodiment, since the ECU 15 refers to the capacitor current detection signal Ic* instead of the terminal voltage detection signal VH*, it is not necessary to perform the PI control when calculating the V-phase correction amount Cv and the W-phase correction amount Cw. Therefore, the V-phase current detection signal Iv* and the W-phase current detection signal Iw* can be corrected more rapidly.

The invention is not limited to the above-described embodiments and can be changed, as appropriate, without deviating from the essence or spirit of the invention read from the claims and the entire description, and the motor controller involving such changes is also included in the technical scope of the invention.

What is claimed is:

1. A motor controller for controlling a motor system, the motor system including:
a direct current power supply;
a power converter configured to convert direct current power supplied from the direct current power supply into alternating current power;
a smoothing capacitor connected electrically in parallel with the power converter;
a three-phase alternating current motor that is driven by using the alternating current power output from the power converter; and
a current sensor that detects a phase current supplied to the three-phase alternating current motor,
the motor controller comprising:
an electronic control unit configured to:
(a) specify a target phase that is a phase of a second phase voltage command signal having second signal level and a first phase voltage command signal having a first signal level that is neither a maximum nor a minimum signal level, wherein the difference between the second signal level and the first signal level is a greater than another signal level difference between a third phase voltage command signal having a third signal level and the first signal level, based on three phase voltage command signals generated from a detection value of the current sensor, the three phase voltage command signals regulating operation of the three-phase alternating current motor; and
(b) correct the detection value of the current sensor that detects the phase current of the target phase, such that a terminal voltage of the smoothing capacitor matches a desired voltage value;
wherein the electronic control unit is configured to determine a mode of correcting the detection value of the current sensor that detects the phase current of the target phase, based on (i) a polarity of the phase current of the target phase and (ii) a tendency of change of the terminal voltage.

2. The motor controller according to claim 1, wherein
the electronic control unit is configured to correct the detection value of the current sensor that detects the phase current of the target phase, in a first correction mode, when the polarity of the phase current of the target phase is a first polarity and the terminal voltage changes in a first change mode; and
the electronic control unit is configured to correct the detection value of the current sensor that detects the phase current of the target phase, in a second correction mode that is different from the first correction mode, when the polarity of the phase current of the target phase is a second polarity that is different from the first polarity and the terminal voltage changes in the first change mode.

3. The motor controller according to claim 2, wherein
the first polarity is either of a positive polarity and a negative polarity,
the second polarity is different from the first polarity among the positive polarity and the negative polarity,
the first change mode is either of a change mode in which the terminal voltage decreases and a change mode in which the terminal voltage increases,
the first correction mode is either of a correction mode in which the detection value is increased and a correction mode in which the detection value is decreased, and
the second correction mode is a correction mode that is different from the first correction mode, among the correction mode in which the detection value is increased and the correction mode in which the detection value is decreased.

4. The motor controller according to claim 1, wherein
the electronic control unit is configured to correct the detection value of the current sensor that detects the phase current of the target phase, in a first correction mode when the polarity of the phase current of the target phase is a first polarity and the terminal voltage changes in a first change mode, and
the electronic control unit is configured to correct the detection value of the current sensor that detects the phase current of the target phase, in a second correction mode that is different from the first correction mode, when the polarity of the phase current of the target phase is the first polarity and the terminal voltage changes in a second change mode that is different from the first change mode.

5. The motor controller according to claim 4, wherein
the first polarity is either of a positive polarity and a negative polarity,
the first change mode is either of a change mode in which the terminal voltage decreases and a change mode in which the terminal voltage increases,
the second change mode is a change mode that is different from the first change mode, among the change mode in which the terminal voltage decreases and the change mode in which the terminal voltage increases, the first correction mode is either of a correction mode in which the detection value is increased and a correction mode in which the detection value is decreased, and the second correction mode is a correction mode that is different from the first correction mode, among the correction mode in which the detection value is increased and the correction mode in which the detection value is decreased.

6. The motor controller according to claim 1, wherein the electronic control unit is configured to correct and decrease the detection value of the current sensor that detects the phase current of the target phase, when the polarity of the phase current of the target phase is a negative polarity and the terminal voltage decreases.

7. The motor controller according to claim 1, wherein the electronic control unit is configured to correct and increase the detection value of the current sensor that detects the phase current of the target phase, when the polarity of the phase current of the target phase is a positive polarity and the terminal voltage decreases.

8. The motor controller according to claim 1, wherein the electronic control unit is configured to correct and increase the detection value of the current sensor that detects the phase current of the target phase, when the polarity of the phase current of the target phase is a negative polarity and the terminal voltage increases.

9. The motor controller according to claim 1, wherein the electronic control unit is configured to correct and decrease the detection value of the current sensor that detects the phase current of the target phase, when the polarity of the phase current of the target phase is a positive polarity and the terminal voltage increases.

10. The motor controller according to claim 1, wherein the motor system further includes a voltage sensor and an extraction device, the voltage sensor detects the terminal voltage, the extraction device is configured to extract a voltage component having a frequency same as that of the phase voltage command signals from the detection value of the voltage sensor, and the electronic control unit is configured to correct the detection value of the current sensor that detects the phase current of the target phase, such that a voltage value of the voltage component extracted by the extraction device matches the desired voltage value.

11. The motor controller according to claim 1, wherein the motor system further includes a voltage sensor and an extraction device, the voltage sensor detects the terminal voltage, and the extraction device is configured to extract a voltage component having a frequency that is twice the frequency of the phase voltage command signals from a detection value of the voltage sensor, and the electronic control unit is configured to correct the detection value of the current sensor that detects the phase current of the target phase, such that a voltage value of the voltage component extracted by the extraction device matches the desired voltage value.

12. The motor controller according to claim 1, wherein the motor system further includes a voltage sensor and a voltage converter, the voltage sensor detects the terminal voltage, the voltage converter is configured to convert a voltage value of direct current power that is supplied from the direct current power supply, such that the voltage value matches the desired voltage value, the power converter is configured to convert the direct current power into the alternating current power, the voltage value supplied from the voltage converter having been converted to the direct current power, and the electronic control unit is configured to correct the detection value of the current sensor that detects the phase current of the target phase, such that a voltage component matches the desired voltage value, the voltage component being obtained by removing an effect of a change of the terminal voltage caused by the operation of converting the voltage value performed by the voltage converter from the detection value of the voltage sensor.

13. The motor controller according to claim 1, wherein the motor system further includes a voltage sensor and a voltage converter, the voltage sensor detects the terminal voltage, the voltage converter is configured to convert a voltage value of direct current power supplied from the direct current power supply, such that a voltage component matches the desired voltage value, the voltage component being obtained by removing, from the detection value of the voltage sensor, the voltage component having a frequency same as that of the phase voltage command signals and a voltage component having a frequency twice the frequency of the phase voltage command signals, and the power converter is configured to convert the direct current power into the alternating current power, the voltage value supplied from the voltage converter having been converted to the direct current power.

14. The motor controller according to claim 1, wherein the electronic control unit is configured to correct the detection value of the current sensor that detects the phase current of the target phase, such that a capacitor current flowing in the smoothing capacitor matches a desired current value.

\* \* \* \* \*